United States Patent
Naohara et al.

(10) Patent No.: US 12,271,448 B2
(45) Date of Patent: *Apr. 8, 2025

(54) DATA PROCESSING METHOD, DATA PROCESSING APPARATUS, AND RECORDING MEDIUM WITH DATA PROCESSING PROGRAM RECORDED THEREON

(71) Applicant: SCREEN Holdings Co., Ltd., Kyoto (JP)

(72) Inventors: Hideji Naohara, Kyoto (JP); Tomonori Fujiwara, Kyoto (JP); Yumiko Hirato, Kyoto (JP); Atsushi Sonoda, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,213

(22) Filed: Sep. 21, 2023

(65) Prior Publication Data

US 2024/0012880 A1 Jan. 11, 2024

Related U.S. Application Data

(63) Continuation of application No. 17/535,578, filed on Nov. 25, 2021, now Pat. No. 11,829,451, which is a
(Continued)

(30) Foreign Application Priority Data

Sep. 20, 2018 (JP) .................... 2018-176256

(51) Int. Cl.
*G05B 23/02* (2006.01)
*G06F 3/0482* (2013.01)
(Continued)

(52) U.S. Cl.
CPC ........ *G06F 18/2415* (2023.01); *G06F 3/0482* (2013.01); *G06F 11/324* (2013.01); *G06F 18/00* (2023.01)

(58) Field of Classification Search
CPC .. G06F 18/2415; G06F 3/0482; G06F 11/324; G06F 18/00; G06F 2218/16;
(Continued)

(56) References Cited

U.S. PATENT DOCUMENTS 10,447,546 B1 * 10/2019 Guo ................... H04L 41/20
2008/0205693 A1 8/2008 Kitamura et al.
(Continued)

FOREIGN PATENT DOCUMENTS

JP H08279526 10/1996
JP H0954613 2/1997
(Continued)

*Primary Examiner* — Hien L Duong
(74) *Attorney, Agent, or Firm* — JCIPRNET

(57) ABSTRACT

A data processing method includes a step of obtaining evaluated values of the time-series data by comparing the time-series data with reference data, a step of classifying the evaluated values into a plurality of levels, a step of displaying an evaluation result screen including a display area including a first graph showing an occurrence rate of each level of the evaluated values, the evaluation result screen including the display area with respect to each of the two or more processing units. A history screen displaying a history in which the evaluated values have been obtained and a trend screen including graphs showing temporal change in the evaluated values in addition to the evaluation result screen is hierarchically displayed. A mark is attached at a position corresponding to a processing result selected in the history screen in a graph in the trend screen.

20 Claims, 17 Drawing Sheets

Related U.S. Application Data continuation of application No. 16/543,611, filed on Aug. 18, 2019, now Pat. No. 11,243,862.

(51) Int. Cl.
*G06F 11/32* (2006.01)
*G06F 18/00* (2023.01)
*G06F 18/2415* (2023.01)

(58) Field of Classification Search
CPC ...... G05B 19/4183; G05B 2219/32128; G05B 23/0221; G05B 23/0235; G05B 23/0272
See application file for complete search history.

(56) References Cited

U.S. PATENT DOCUMENTS

| | | | |
|---|---|---|---|
| 2011/0213488 A1* | 9/2011 | Suzuki | G05B 23/0272 700/109 |
| 2015/0262396 A1* | 9/2015 | Devarajan | H04L 67/02 345/440.1 |
| 2017/0004258 A1* | 1/2017 | Wang | G16H 40/63 |
| 2017/0285613 A1* | 10/2017 | Asai | G05B 19/406 |
| 2019/0101898 A1* | 4/2019 | Middendorf | G06Q 10/06313 |
| 2020/0051176 A1* | 2/2020 | Liu | G06Q 20/40 |

FOREIGN PATENT DOCUMENTS

| | | |
|---|---|---|
| JP | H09184069 | 7/1997 |
| JP | 2008209131 | 9/2008 |

* cited by examiner

DATA PROCESSING METHOD, DATA PROCESSING APPARATUS, AND RECORDING MEDIUM WITH DATA PROCESSING PROGRAM RECORDED THEREON

CROSS-REFERENCE TO RELATED APPLICATION

This application is a continuation application and claims the priority benefit of U.S. application Ser. No. 17/535,578, filed on Nov. 25, 2021, now allowed. The application U.S. application Ser. No. 17/535,578 is a continuation application of and claims the priority benefit of U.S. application Ser. No. 16/543,611, filed on Aug. 18, 2019, now patented, which claims the priority benefits of Japan Patent Application No. 2018-176256, filed on Sep. 20, 2018. The entirety of the above-mentioned patent application is hereby incorporated by reference herein and made a part of this specification.

BACKGROUND

Technical Field

The disclosure relates to digital data processing and, particularly, to a method, apparatus and program for processing data from measurement in a substrate processing apparatus.

Description of Related Art

As a method of detecting an abnormality of an apparatus or device, a method of measuring a physical quantity indicating an operation state of the apparatus or device (e.g., length, angle, time, speed, force, pressure, voltage, current, temperature, flowrate, and the like) using sensors and analyzing time-series data obtained by arranging measurement results in chronological order is known. When an apparatus or a device performs the same operation under the same conditions, if the apparatus or device does not have an abnormality, time-series data changes in the same manner. Accordingly, a portion where an abnormality has been generated and the cause of the abnormality can be identified by comparing a plurality of pieces of time-series data varying in the same manner to detect abnormal time-series data and analyzing the detected abnormal time-series data.

In a process of manufacturing a semiconductor substrate (hereinafter a substrate), a series of processes is performed using a plurality of substrate processing apparatuses. A substrate processing apparatus includes one or more processing units that perform specific processes among the series of processes on substrates. The processing unit performs a process according to a predetermined procedure (referred to as a recipe) on substrates. Here, time-series data is acquired on the basis of measurement results in the processing unit. It is possible to identify a processing unit having an abnormality and the cause of the abnormality by analyzing the acquired time-series data.

With regard to the disclosure, Japanese Patent Laid-Open No. 2001-265431 discloses an error output method of displaying error information with respect to an independently generated error in a first layer and displaying error information with respect to an error generated caused by a preceding error in a lower layer area the same as or lower than a second layer. WO 03/85504 discloses a graphical user interface for semiconductor system processes including a screen for displaying various types of information.

In a substrate processing apparatus, a plurality of pieces of time-series data are acquired on the basis of a plurality of measurement results. Accordingly, a user (an operator of the substrate processing apparatus) cannot easily ascertain a state of the substrate processing apparatus when the user views a display screen including all abnormalities of time-series data.

Therefore, the disclosure provides a data processing method by which a state of a substrate processing apparatus can be easily ascertained.

SUMMARY

According to an exemplary embodiment of the disclosure, a data processing method for processing time-series data acquired in a substrate processing apparatus including one or more processing units, the time-series data being data obtained from physical quantities measured using a sensor during execution of processing performed on one substrate in a processing unit. The method includes: obtaining evaluated values of the time-series data by comparing the time-series data with reference data, the reference data being other time-series data determined as expectation value data; classifying the evaluated values into a plurality of levels; and displaying an evaluation result screen including a display area including a first graph showing an occurrence rate of each level of the evaluated values, the evaluation result screen including the display area with respect to each of the two or more processing units. A plurality of the display areas are two-dimensionally disposed within the evaluation result screen. A history screen displaying a history in which the evaluated values have been obtained and a trend screen including graphs showing temporal change in the evaluated values in addition to the evaluation result screen is hierarchically displayed. A mark is attached at a position corresponding to a processing result selected in the history screen in a graph in the trend screen.

According to an exemplary embodiment of the disclosure, the plurality of levels includes a best level and a worst level, the level is better as the evaluated value is smaller.

According to an exemplary embodiment of the disclosure, the first graph is displayed so that a worse level is displayed in a darker color.

According to an exemplary embodiment of the disclosure, the first graph is a circle graph or a band graph.

According to an exemplary embodiment of the disclosure, the evaluation result screen further includes the number of occurrences of each level of the evaluated values with respect to each of the two or more processing units.

According to an exemplary embodiment of the disclosure, the plurality of levels includes a best level and a worst level, the level is better as the evaluated value is smaller, and the evaluation result screen further includes a second graph showing temporal change in the number of occurrences of a worst level of the evaluated values when substrates have been processed through a predetermined method with respect to each of the two or more processing units.

According to an exemplary embodiment of the disclosure, the second graph is a bar graph or a broken line graph.

According to an exemplary embodiment of the disclosure, the data processing method further includes selecting levels related to substrates which satisfy a given condition from levels obtained, and displaying the evaluation result screen on the basis of the levels selected.

According to an exemplary embodiment of the disclosure, the levels having at least any of a substrate processing period, a process performed on substrates, and a processing unit which has processed substrates as a condition are selected.

According to an exemplary embodiment of the disclosure, at least any of a screen for selecting a method through which the evaluated values have been obtained, a history screen displaying a history in which the evaluated values have been obtained, a screen for selecting a display target and a screen including a graph of the time-series data, or a trend screen including graphs showing temporal change in the evaluated values in addition to the evaluation result screen is hierarchically displayed.

According to an exemplary embodiment of the disclosure, wherein the plurality of levels includes a best level and a worst level, the level is better as the evaluated value is smaller, and a log statistics screen including a graph showing temporal change in the number of occurrences of each level of the evaluated values with respect to substrates processed within a totalization period, and a graph showing the number of occurrences of the worst level of the evaluated values, which is divided into occurrence causes, in a ranking form with respect to substrates processed within the totalization period is displayed.

According to an exemplary embodiment of the disclosure, the reference data is other time-series data.

According to an exemplary embodiment of the disclosure, a data processing apparatus for processing time-series data acquired in a substrate processing apparatus including one or more processing units, the time-series data being data obtained from physical quantities measured using a sensor during execution of processing performed on one substrate in a processing unit. The data processing apparatus comprises includes: a computer that: obtains evaluated values of the time-series data by comparing the time-series data with reference data, the reference data being other time-series data determined as expectation value data; classifies the evaluated values into a plurality of levels; and displays an evaluation result screen including a display area including a first graph showing an occurrence rate of each level of the evaluated values, the evaluation result screen including the display area with respect to each of the two or more processing units. A plurality of the display areas are two-dimensionally disposed within the evaluation result screen. A history screen displaying a history in which the evaluated values have been obtained and a trend screen including graphs showing temporal change in the evaluated values in addition to the evaluation result screen is hierarchically displayed. A mark is attached at a position corresponding to a processing result selected in the history screen in a graph in the trend screen.

According to an exemplary embodiment of the disclosure, the evaluation result screen further includes the number of occurrences of each level of the evaluated values with respect to each of the two or more processing units.

According to an exemplary embodiment of the disclosure, the plurality of levels includes a best level and a worst level, the level is better as the evaluated value is smaller, and the evaluation result screen further includes a second graph showing temporal change in the number of occurrences of a worst level of the evaluated values when substrates have been processed through a predetermined method with respect to each of the two or more processing units.

According to an exemplary embodiment of the disclosure, wherein the computer further selects levels related to substrates which satisfy a given condition from levels obtained, and displays the evaluation result screen on the basis of the levels selected.

According to an exemplary embodiment of the disclosure, the computer hierarchically displays at least any of a screen for selecting a method through which the evaluated values have been obtained, a history screen displaying a history in which the evaluated values have been obtained, a screen for selecting a display target and a screen including a graph of the time-series data, or a trend screen including graphs showing temporal change in the evaluated values in addition to the evaluation result screen.

According to an exemplary embodiment of the disclosure, there is provided a recording medium recording a data processing program for processing time-series data acquired in a substrate processing apparatus including one or more processing units, the data processing program causing a computer to execute, by a CPU using a memory: obtaining evaluated values of the time-series data by comparing the time-series data with reference data, the reference data being other time-series data determined as expectation value data; classifying the evaluated values into a plurality of levels; and displaying an evaluation result screen including a display area including a first graph showing an occurrence rate of each level of the evaluated values, the evaluation result screen including the display area with respect to each of the two or more processing units. A history screen displaying a history in which the evaluated values have been obtained and a trend screen including graphs showing temporal change in the evaluated values in addition to the evaluation result screen is hierarchically displayed. A mark is attached at a position corresponding to a processing result selected in the history screen in a graph in the trend screen.

BRIEF DESCRIPTION OF THE DRAWINGS

FIG. 13 is a diagram showing a scoring history screen of the data processing apparatus shown in FIG. 1.

FIG. 14 is a diagram showing a detailed score screen of the data processing apparatus shown in FIG. 1.

FIG. 17 is a diagram showing a summary screen of the data processing apparatus shown in FIG. 1.

DESCRIPTION OF THE EMBODIMENTS

Figure 1:
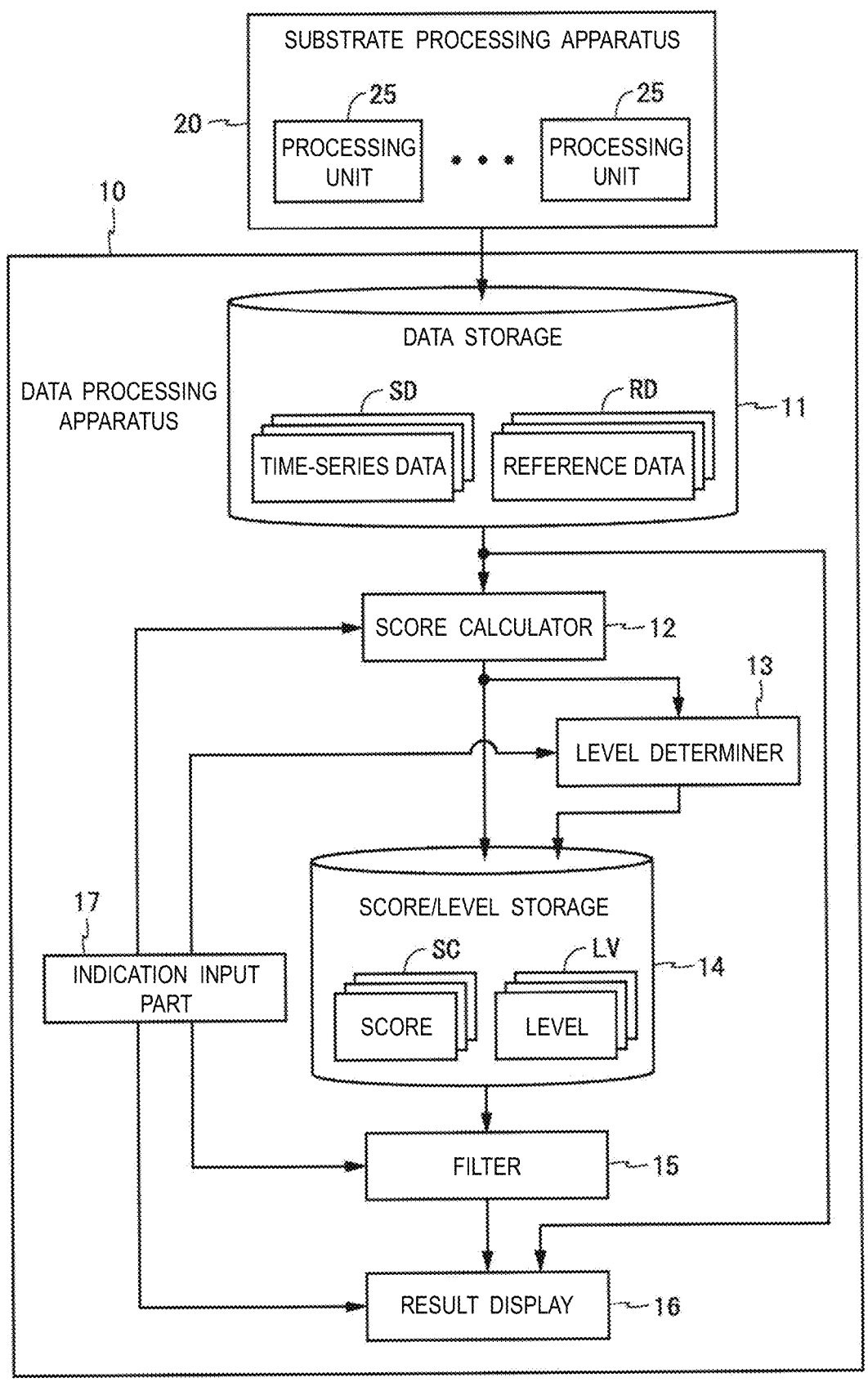
FIG. 1 is a block diagram showing a configuration of a data processing apparatus according to an embodiment of the disclosure.

According to one or more exemplary embodiments of the disclosure, the evaluation result screen including the first graph showing an occurrence rate of each level of evaluated values is displayed with respect to a processing unit. Accordingly, a user can easily recognize a rate at which each level (particularly, a worst level) occurs with respect to the processing unit by viewing the first graph. Particularly, when the substrate processing apparatus includes a plurality of processing units, the user can easily recognize a processing unit in which a worst level occurs at a high rate by comparing a plurality of first graphs. In this manner, the user can easily ascertain a state of the substrate processing apparatus.

According to one or more exemplary embodiments of the disclosure, the aforementioned effects become significant by displaying the first graph in a state in which a worse level is recognized more easily (in a darker color).

According to one or more exemplary embodiments of the disclosure, it is possible to easily display an occurrence rate of each level of evaluated values by using a circle graph or a band graph as the first graph.

According to one or more exemplary embodiments of the disclosure, the user can be aware of a correct value of the number of occurrences of each level of evaluated values in the processing unit.

According to one or more exemplary embodiments of the disclosure, the user can ascertain temporal change in a situation in which a worst level occurs and recognize whether a processing unit is approaching an abnormal state by viewing the second graph.

According to one or more exemplary embodiments of the disclosure, it is possible to easily show temporal change in a situation in which a worst level occurs by using a bar graph or a broken line graph as the second graph.

According to one or more exemplary embodiments of the disclosure, the evaluation result screen is displayed on the basis of levels of evaluated values related to substrates which satisfy a condition. Accordingly, the user can easily ascertain a state of the substrate processing apparatus by applying a suitable condition.

According to one or more exemplary embodiments of the disclosure, the user can easily ascertain states of processing units in a specific period, states of processing units when a specific process has been performed, and a state of a specific processing unit.

According to one or more exemplary embodiments of the disclosure, the user can easily analyze time-series data or evaluated values with respect to substrates having evaluated values of worse levels by hierarchically displaying various screens.

According to one or more exemplary embodiments of the disclosure, the user can easily recognize a position on a graph in a trend screen which corresponds to a processing result selected in a history screen.

According to one or more exemplary embodiments of the disclosure, the user can easily recognize temporal change in the number of occurrences of each level of evaluated values and recognize a factor that causes many worst levels to occur by viewing the log statistics screen.

According to one or more exemplary embodiments of the disclosure, it is possible to obtain suitable evaluated values with respect to time-series data by using other time-series data as reference data.

These and other objectives, features, aspects and effects of the disclosure will become further clear through the following detailed description with reference to the attached drawings.

Hereinafter, a data processing method, a data processing apparatus, and a data processing program according to embodiments of the disclosure will be described with reference to the drawings. A data processing method according to the present embodiment is typically performed using a computer. A data processing program according to the present embodiment is a program for embodying the data processing method using a computer. A data processing apparatus according to the present embodiment is typically configured using a computer. The computer that executes the data processing program serves as a data processing apparatus.

FIG. 1 is a block diagram showing a configuration of the data processing apparatus according to an embodiment of the disclosure. The data processing apparatus 10 shown in FIG. 1 includes a data storage 11, a score calculator 12, a level determiner 13, a score/level storage 14, a filter 15, a result display 16, and an instruction input part 17. The data processing apparatus 10 is used by being connected to a substrate processing apparatus 20.

The substrate processing apparatus 20 includes a plurality of processing units 25, and a plurality of physical quantities (e.g., length, angle, time, speed, force, pressure, voltage, current, temperature, flow rate, and the like, hereinafter, referred to as parameters) indicating operation states of the processing units 25 are measured in each processing unit 25. Accordingly, a plurality of pieces of time-series data SD are acquired. Meanwhile, although the substrate processing apparatus 20 includes a plurality of processing units 25 here, the substrate processing apparatus 20 may include one processing unit 25. In general, the substrate processing apparatus 20 may include one or more processing units 25.

The data storage 11 stores the time-series data SD obtained through the aforementioned method and reference data RD that is expectation value data of the time-series data SD. For example, other time-series data determined to be most suitable as expectation value data among the plurality of time-series data is used as the reference data RD. The score calculator 12 obtains evaluated values (hereinafter referred to as scores) with respect to the time-series data SD stored in the data storage 11. The score calculator 12 reads reference data RD corresponding to the time-series data SD from the data storage 11 and obtains scores SC by comparing the reference data RD with the time-series data SD.

The level determiner 13 classifies the scores SC obtained in the score calculator 12 into a plurality of levels and outputs levels LV of the scores SC. The score/level storage 14 stores the scores SC obtained in the score calculator 12 and the levels LV obtained in the level determiner 13. The filter 15 selects a score SC and a level LV with respect to a substrate that satisfies a given condition from the stores SC and the levels LV stored in the score/level storage 14. The score calculator 12 serves as an evaluated value calculator and the filter 15 serves as a level selector.

The result display 16 displays an evaluation result screen including a graph showing an occurrence rate of each level of scores SC with respect to the processing units 25. An instruction from a user is input to the instruction input part 17. The user specifies a score calculation method in the score calculator 12, a level setting method in the level determiner 13, a filtering method in the filter 15, selection of a screen displayed on the result display 16, and the like using the instruction input part 17.

Figure 2:
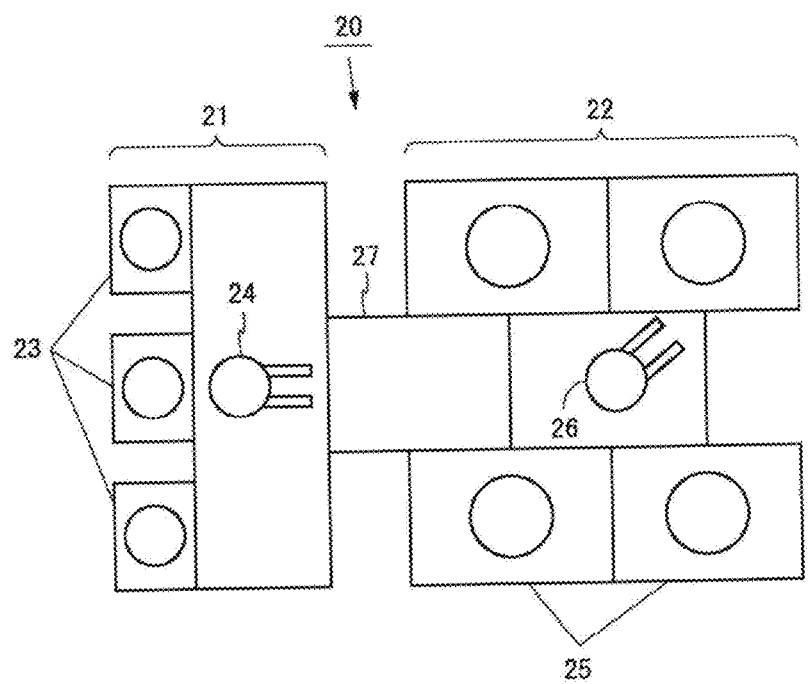
FIG. 2 is a diagram showing a schematic configuration of a substrate processing apparatus shown in FIG. 1.

FIG. 2 is a diagram showing a schematic configuration of the substrate processing apparatus 20. The substrate processing apparatus 20 includes an indexer 21 and a processor 22. The indexer 21 includes a plurality of cassette holders 23 and an indexer robot 24. The processor 22 includes a plurality of processing units 25 and a substrate conveying robot 26. Cassettes (not shown) that accommodate a plurality of substrates are mounted in the cassette holders 23. The indexer robot 24 performs an operation of taking a substrate out of a cassette and an operation of inserting a substrate into a cassette. The processing unit 25 has a space (hereinafter referred to as a chamber) for performing processes on substrates. The chambers have a one-to-one correspondence with the processing units 25. For example, a process of cleaning a substrate using a processing solution, and the like are performed inside the chamber. The substrate conveying robot 26 performs an operation of inserting a substrate into the processing unit 25 and an operation of taking a substrate out of the processing unit 25. The number of processing units 25 may be arbitrary. When the number of processing units 25 is 12, for example, tower structures in which three processing units 25 are stacked are provided around four positions of the substrate conveying robot 26.

The indexer robot 24 takes a substrate that is a processing target out of a cassette mounted in the cassette holder 23 and transfers the taken substrate to the substrate conveying robot 26 through a substrate delivery part 27. The substrate conveying robot 26 inserts the substrate received from the indexer robot 24 into a target processing unit 25. When a process performed on the substrate ends, the substrate conveying robot 26 takes the substrate out of the target processing unit 25 and transfers the taken substrate to the indexer robot 24 through the substrate delivery part 27. The indexer robot 24 inserts the substrate received from the substrate conveying robot 26 into a target cassette. The indexer 21 and the processor 22 are controlled by a controller (not shown) of the substrate processing apparatus 20.

Figure 3:
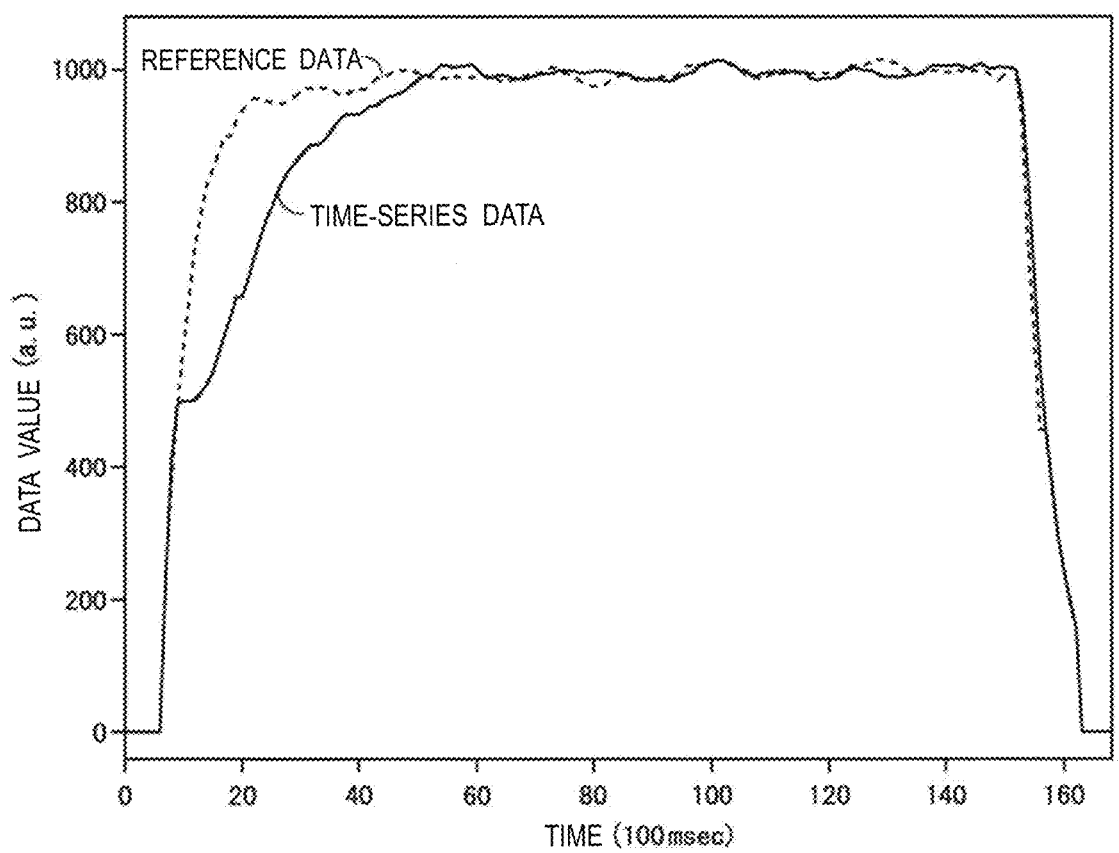
FIG. 3 is a diagram showing time-series data in the data processing apparatus shown in FIG. 1 as a graph.

Hereinafter, a process of performed by the processing unit 25 on one substrate is referred to as a "unit process." A plurality of physical quantities (parameters) are measured in the processing unit 25 using a sensor and the like during execution of the unit process. A plurality of pieces of time-series data SD are acquired on the basis of results of measurement of a plurality of physical quantities. The acquired plurality of pieces of time-series data SD are stored in the data storage 11. If the time-series data SD is represented as a graph, the time-series data SD is represented by a solid line shown in FIG. 3, for example. If corresponding reference data RD is represented as a graph, the reference data RD is represented by a broken line shown in FIG. 3, for example. In the example shown in FIG. 3, the time-series data SD rises later than the reference data RD.

Figure 4:
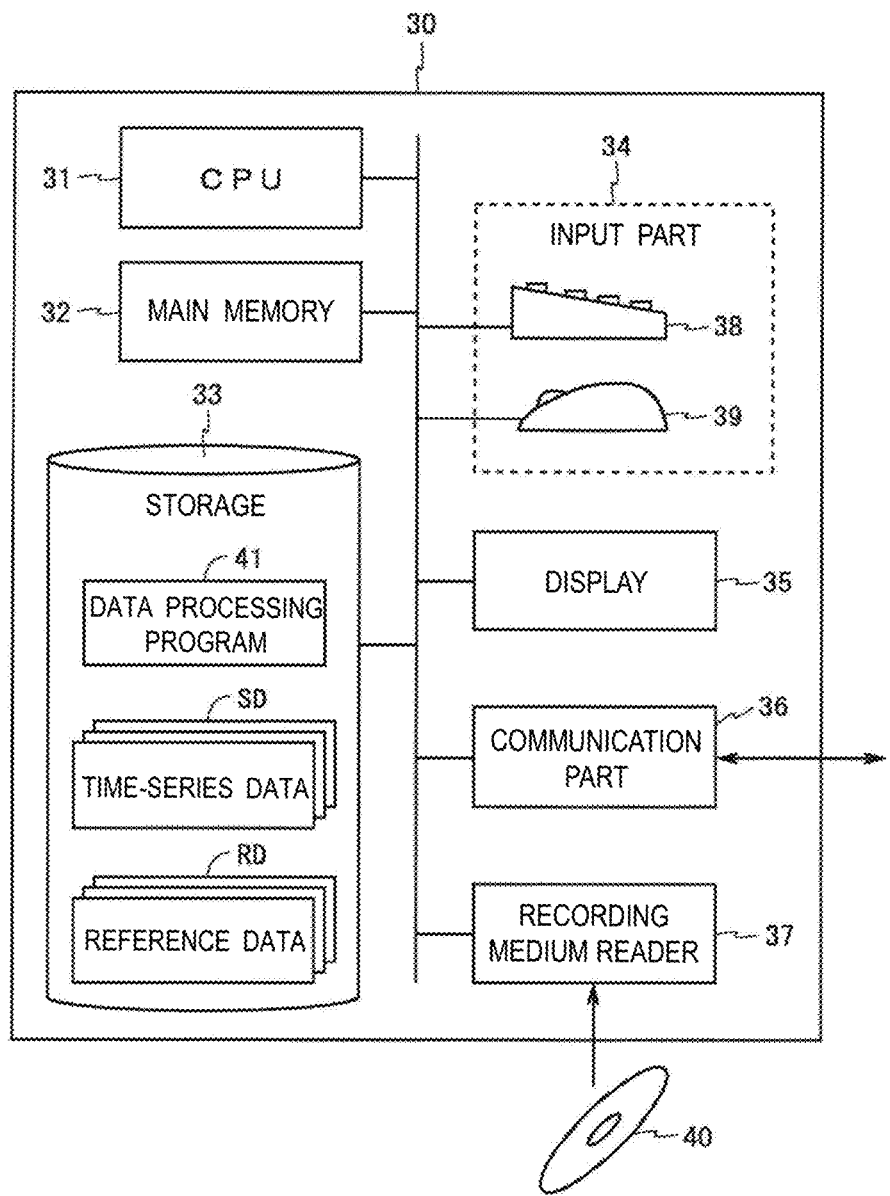
FIG. 4 is a block diagram showing an example of a configuration of a computer serving as the data processing apparatus shown in FIG. 1.

FIG. 4 is a block diagram showing an example of a configuration of a computer serving as the data processing apparatus 10. A computer 30 shown in FIG. 4 includes a CPU 31, a main memory 32, a storage 33, an input part 34, a display 35, a communication part 36, and a recording medium reader 37. For example, a DRAM is used as the main memory 32. For example, a hard disk is used as the storage 33. For example, a keyboard 38 and a mouse 39 are used as the input part 34. For example, a liquid crystal display is used as the display 35. The communication part 36 is an interface circuit of wired communication or wireless communication. Communication between the substrate processing apparatus 20 and other data processing apparatuses is performed using the communication part 36. The recording medium reader 37 is an interface circuit of a recording medium 40 having programs and the like recorded thereon. For example, a non-transient recording medium such as a CD-ROM is used as the recording medium 40. Meanwhile, the above-described configuration of the computer 30 is merely an example and the data processing apparatus 10 can be configured using any computer.

Hereinafter, a case in which the computer 30 serves as the data processing apparatus 10 will be described. In this case, the storage 33 stores a data processing program 41, time-series data SD and reference data RD. The time-series data SD is received from the substrate processing apparatus 20 using the communication part 36. The data processing program 41 and the reference data RD may be received from servers or other computers using the communication part 36 or read from the recording medium 40 using the recording medium reader 37, for example. The reference data RD may be selected by a user from time-series data SD stored in the storage 33 using the input part 34. When the data processing program 41 is executed, the data processing program 41, the time-series data SD and the reference data RD are copied and transferred to the main memory 32. The CPU 31 performs a process of obtaining scores SC of time-series data SD, a process of obtaining levels LV of the scores SC, a process of selecting a score SC and a level LV with respect to a substrate that satisfies a given condition, a process of displaying an evaluation result screen on the basis of the selected score SC and level LV, and the like by executing the data processing program 41 stored in the main memory 32 using the main memory 32 as a working memory. Here, the computer 30 serves as the data processing apparatus 10.

Figure 5:
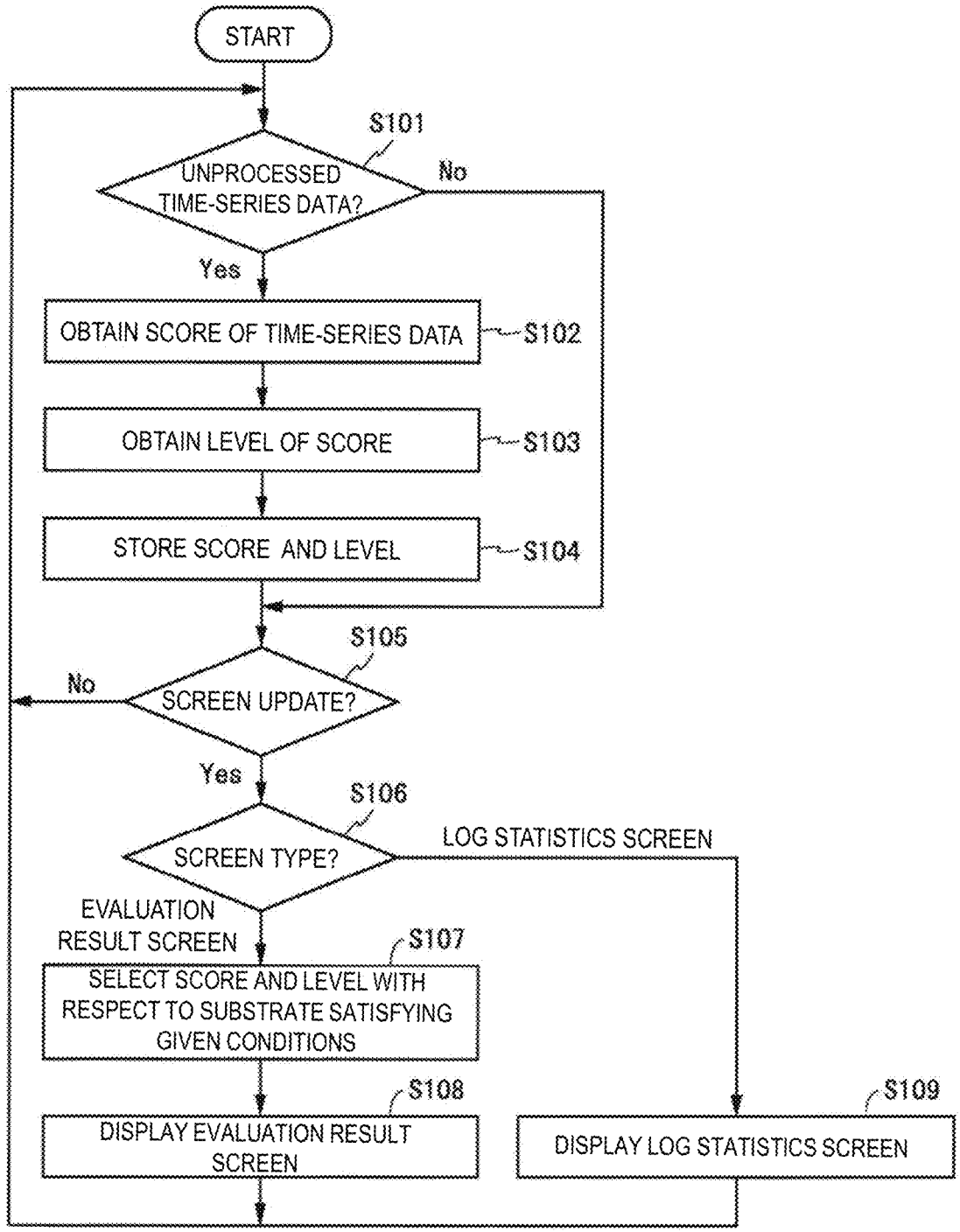
FIG. 5 is a flowchart showing an operation of the data processing apparatus shown in FIG. 1.

FIG. 5 is a flowchart showing an operation of the data processing apparatus 10. Time-series data SD and reference data RD are stored in the data storage 11 before the operation of the data processing apparatus 10 is started. The data processing apparatus 10 repeatedly performs steps S101 to S109 shown in FIG. 5.

As shown in FIG. 5, the score calculator 12 determines whether there is unprocessed time-series data SD, proceeds to step S102 in the case of "YES" and proceeds to step S105 in the case of "NO" (step S101). In the former case, the score calculator 12 obtains a score SC of the unprocessed time-series data SD (step S102). In step S102, the score calculator 12 obtains the score SC by comparing the time-series data SD with corresponding reference data RD.

Next, the level determiner 13 obtains a level LV of the score SC obtained in step S102 (step S103). The level determiner 13 has a plurality of threshold values used for level classification of the score SC. In step S103, the level determiner 13 obtains a level LV of the score SC by comparing the score SC obtained in step S102 with the plurality of threshold values. Subsequently, the score/level storage 14 stores the score SC obtained in step S102 and the level LV obtained in step S103 (step S104).

Next, the result display 16 determines whether to update a screen, proceeds to step S106 in the case of "YES" and proceeds to step S101 in the case of "N" (step S105). In step S105, the result display 16 determines that the screen is updated when the user inputs an instruction, or the like when the score/level storage 14 stores a new level LV.

In the case of "YES" in step S105, the result display 16 determines whether a screen to be displayed is an evaluation result screen or a log statistics screen, proceeds to step S107 in the former case and proceeds to step S109 in the latter case (step S106). In the former case, the filter 15 selects a score SC and a level LV with respect to a substrate that satisfies a given condition from scores SC and levels LV stored in the score/level storage 14 (step S107). Then, the result display 16 displays an evaluation result screen on the basis of the score SC and the level LV selected in step S107 (step S108).

In the case of a log statistics screen in step S106, the result display 16 displays the log statistics screen (step S109). After step S108 or S109 is executed, control of the data processing apparatus 10 proceeds to step S101.

In the flowchart shown in FIG. 5, step S102 executed by the score calculator 12 corresponds to an evaluated value calculation step. Step S103 executed by the level determiner 13 corresponds to a level determination step. Step S107 executed by the filter 15 corresponds to a level selection step. Steps S108 and S109 executed by the result display 16 correspond to a result display step.

Hereinafter, it is assumed that the substrate processing apparatus 20 has 12 processing units 25 and the level determiner 13 classifies scores SC into four levels. When the substrate processing apparatus 20 performs a unit process once, a plurality of pieces of time-series data SD are obtained. The score calculator 12 obtains a score SC with respect to each piece of time-series data SC for each substrate. The level determiner 13 has three threshold values THa to THc (however, THa<THb<THc) in response to types of scores SC. The level determiner 13 classifies scores SC into four levels using the threshold values THa to THc. More specifically, the level determiner 13 classifies a score less than THa, a score equal to or greater than THa and less than THb, a score equal to or greater than THb and less than THc, and a score equal to or greater than THc as levels 1 to 4. A level LV decreases as a score SC decreases (as score SC becomes better). Among levels 1 to 4, level 1 is the best level and level 4 is the worst level.

Figure 6:
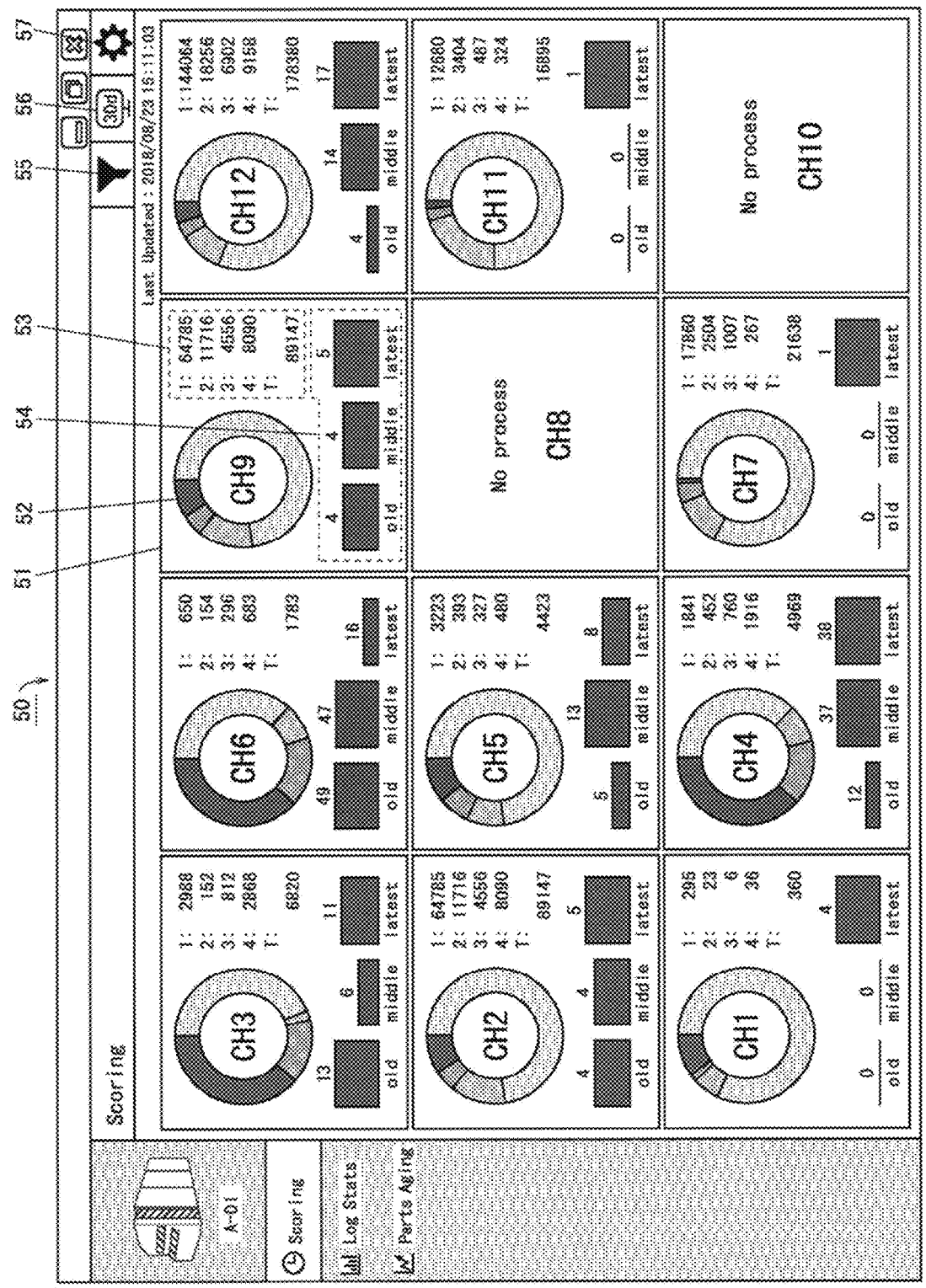
FIG. 6 is a diagram showing an evaluation result screen of the data processing apparatus shown in FIG. 1.

FIG. 6 is a diagram showing an evaluation result screen displayed by the result display 16. The evaluation result screen 50 shown in FIG. 6 has a plurality of display areas 51 corresponding to a plurality of processing units 25. The plurality of display areas 51 are two-dimensionally disposed within the evaluation result screen 50. An external view and an identifier (ID) of the substrate processing apparatus 20, a state display icon, and the like are displayed in the left part of the evaluation result screen 50. Icons 55 to 57 are displayed in the upper part of the evaluation result screen 50. Meanwhile, the evaluation result screen 50 shown in FIG. 6 is a screen for illustrating a case in which the numbers of occurrences of worse levels are large. Practically, the numbers of occurrences of worse levels are less than the values shown in FIG. 6.

The evaluation result screen 50 has 12 display areas 51 corresponding to 12 processing units 25. A circle graph 52, the number 53 of occurrences of a level, and a bar graph 54 are displayed in each display area 51. A character string "CHn (n is a natural number)" displayed in the circle graph 52 indicates that the number of a chamber corresponding to a processing unit 25 is n.

When the evaluation result screen 50 is displayed, a score evaluation period (e.g., 30 days) is set and the numbers of occurrences of levels 1 to 4 of scores SC with respect to the processing units 25 are obtained for substrates processed within the score evaluation period. The number 53 of occurrences of a level includes the numbers of occurrences of levels 1 to 4 and the sum thereof (the number indicated at the lower right of a character T).

The circle graph 52 shows occurrence rates of the levels 1 to 4. The circle graph 52 is displayed in a state in which a worse level is able to be recognized by a user more easily. When the background of the evaluation result screen 50 is white, the circle graph 52 displays a worse level in a darker color, for example. The levels 1 to 4 are respectively displayed in light sky blue, dark sky blue, light blue, and dark blue, for example.

The bar graph 54 shows temporal change in the number of occurrences of a worst level of scores when substrates are processed through a predetermined method. The score evaluation period is divided into three periods (hereinafter referred to as first to third periods) and one recipe (hereinafter referred to as a specific recipe) is selected from a plurality of recipes. Results obtained when a certain substrate (one substrate) has been processed through a specific recipe in the first to third periods are respectively referred to as first to third recipe processing results. The bar graph 54 shows the number of occurrences of level 4 included in the first to third recipe processing results in chronological order. The number of occurrences of level 4 is displayed above each bar of the bar graph 54. "Old," "middle" and "latest" are displayed under the respective bars of the bar graph 54. The bar graph 54 is displayed in such a manner that the height thereof is adjusted such that the height of the highest bar becomes constant.

When the score evaluation period is 30 days, the score evaluation period is divided into a first period until 21 days ago from 30 days ago, a second period until 11 days ago from 20 days ago and a third period until today from 10 days ago. For example, the bar graph 54 shows the number of occurrences of level 4 included in a recipe processing result obtained when a certain substrate has been processed using a specific recipe 30 days ago, the number of occurrences of level 4 included in a recipe processing result obtained when a certain substrate has been processed using the specific recipe 15 days ago, and the number of occurrences of level 4 included in a recipe processing result obtained when a certain substrate has been processed using a specific recipe at the last minute.

The user can easily ascertain a state of the substrate processing apparatus 20 by viewing the evaluation result screen 50. Particularly, the substrate processing apparatus 20 according to the present embodiment includes a plurality of processing units 25. Accordingly, the user can easily ascertain an abnormal state of the substrate processing apparatus 20 which is indicated by a plurality of pieces of time-series data obtained on the basis of a plurality of measurement results in the processing units 25.

Although the evaluation result screen 50 is represented using white, black and a pattern in FIG. 6 for convenience of drawing, the evaluation result screen 50 is actually represented using a plurality of colors. The evaluation result screen 50 may include a band graph showing the number of occurrences of each level of scores instead of the circle graph 52 and include a broken line graph showing temporal change in a situation in which a worst level of scores occurs instead of the bar graph 54. The evaluation result screen 50 may include the bar graph 54 having four or more bars. In addition, results obtained by processing a plurality of substrates using a specific recipe in each of the separate periods may be used as recipe processing results. Further, results obtained by selecting a plurality of recipes as specific recipes and processing substrates using the specific recipes may be used as recipe processing results.

The data processing apparatus 10 has a period filter function, a recipe filter function, a chamber filter function, a hierarchy display function, and a log statistics screen display function in addition to the function of displaying the evaluation result screen 50. Hereinafter, these functions will be described in order.

Figure 7:
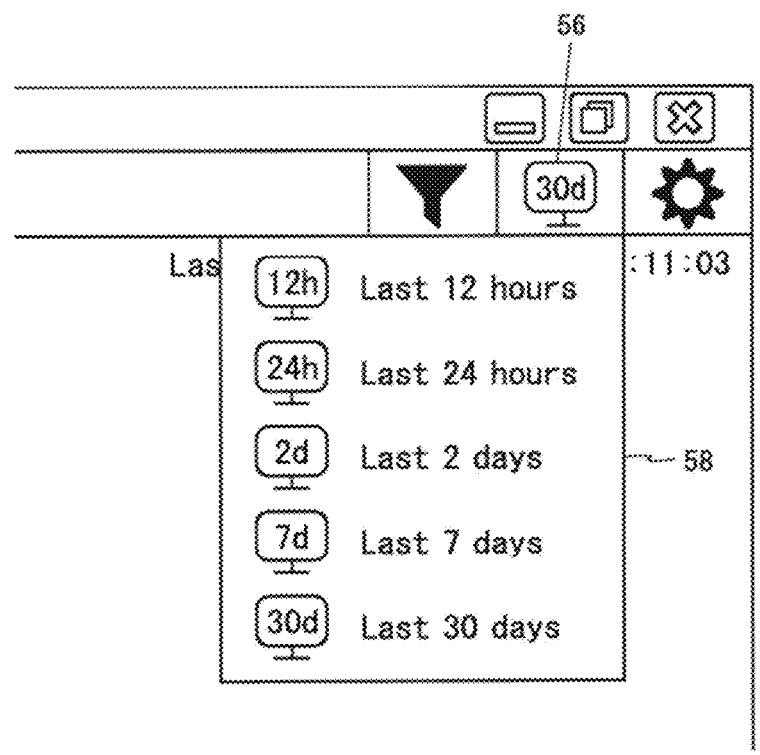
FIG. 7 is an enlarged view of a part of the evaluation result screen shown in FIG. 6.

First, the period filter function will be described. FIG. 7 is an enlarged view of a part of the evaluation result screen 50. When the user operates the mouse 39 to select an icon 56, a pull-down menu 58 shown in FIG. 7 is displayed. Each item of the pull-down menu 58 indicates the length of a score evaluation period. "12 h," "24 h," "2 d," "7 d" and "30 d" respectively indicate 12 hours, 24 hours, 2 days, 7 days and 30 days. The user sets a score evaluation period by operating the mouse 39 to select one item from the pull-down menu 58.

The filter 15 selects scores SC and levels LV related to substrates processed within a score evaluation period from the scores SC and the levels LV stored in the score/level storage 14. The result display 16 displays the evaluation result screen 50 including circle graphs 52, numbers 53 of occurrence of levels and bar graphs 54 with respect to the processing units 25 on the basis of the scores SC and the levels LV selected by the filter 15. For example, when the score evaluation period is 30 days, the numbers 53 of occurrences of levels included in the evaluation result screen 50 indicate the numbers of occurrences of levels 1 to 4 of scores SC with respect to substrates processed until the current time from 30 days ago and the sum thereof.

Figure 8:
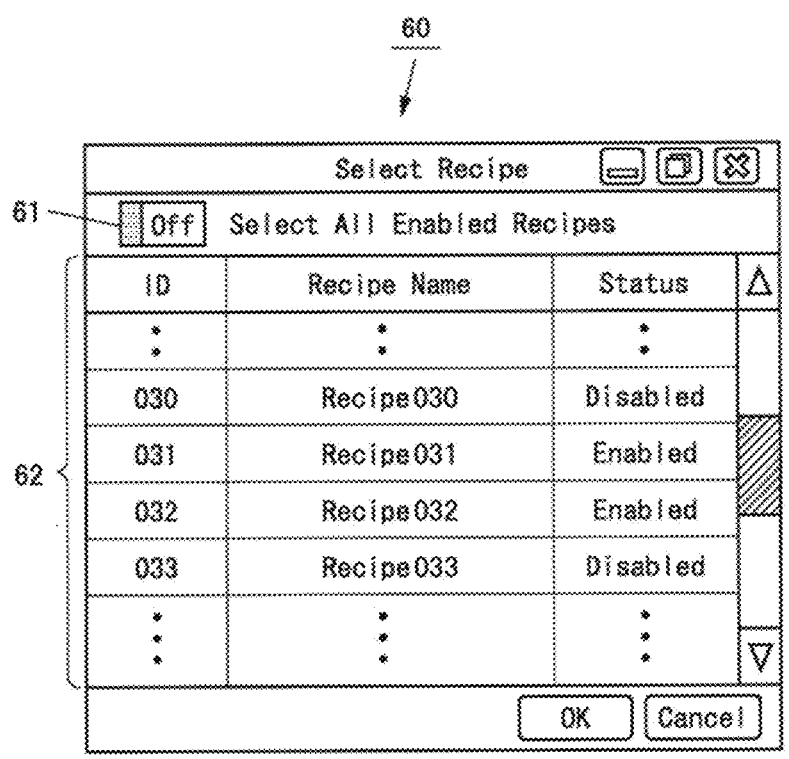
FIG. 8 is a diagram showing a recipe selection screen of the data processing apparatus shown in FIG. 1.

Next, the recipe filter function will be described. When the user operates the mouse 39 to select an icon 55, a recipe selection screen 60 shown in FIG. 8 is displayed to be overlaid on the evaluation result screen 50. The recipe selection screen 60 includes a switch 61 switchable between an on state and an off state and a recipe list 62. A default state of the switch 61 is the on state. A recipe ID, a recipe name and a recipe status are displayed in each row of the recipe list 62. A recipe status is enable or disable.

When the switch 61 is in the on state, all enable recipes included in the recipe list 62 are selected. When the switch 61 is in the off state, the user operates the mouse 39 to select one or a plurality of recipes from the recipe list 62. The filter 15 selects scores SC and levels LV related to substrates processed according to selected recipes from the scores SC and the levels LV stored in the score/level storage 14. The result display 16 displays the evaluation result screen 50 including circle graphs 52, the numbers 53 of occurrences of levels, and bar graphs 54 with respect to the processing units 25 on the basis of the scores SC and the levels LV selected by the filter 15. When a recipe "Recipe031" is selected, for example, the numbers 53 of occurrences of levels included in the evaluation result screen 50 indicate the numbers of occurrences of levels 1 to 4 of scores SC with respect to substrates processed according to the recipe "Recipe031" and the sum thereof.

Figures 9A, 9B:
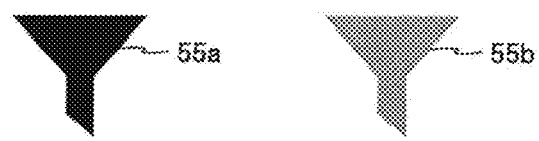
FIGS. 9(a) and 9(b) are diagrams showing change in an icon included in the evaluation result screen shown in FIG. 6.

The icon 55 is displayed in a state depending on the state of the switch 61. When the switch 61 is in the on state, an icon 55a shown in FIG. 9(a) is displayed using a predetermined color. When the switch 61 is in the off state, an icon 55b shown in FIG. 9(b) is displayed using a different color. By displaying the icon 55 in different states (in different colors) in response to a recipe filter application state in this manner, the user can easily ascertain whether the recipe filter is applied.

Figure 10:
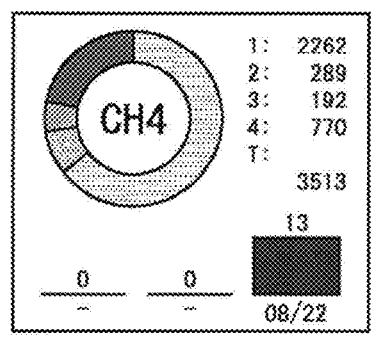
FIG. 10 is a diagram showing a part of the evaluation result screen shown in FIG. 6.

If a plurality of recipes are selected when the switch 61 is in the on state or off state, "old," "middle" and "latest" are displayed under the bars of the bar graph 54 as described above (FIG. 6). On the other hand, if only one recipe is selected when the switch 61 is in the off state, a start date (or start time) of a process performed on substrates when a third recipe processing result has been acquired is displayed under the third bar of the bar graph 54, as shown in FIG. 10. A character string "08/22" represented in FIG. 10 indicates that the start date of the process performed on substrates when the third recipe processing result has been acquired is 22 August. A symbol "-" indicating that a period is other than a target period is displayed under the first and second bars of the bar graph 54. By performing the aforementioned display when only one recipe is selected, the user can ascertain a date and time when time-series data has been processed for a detailed examination.

Figure 11:
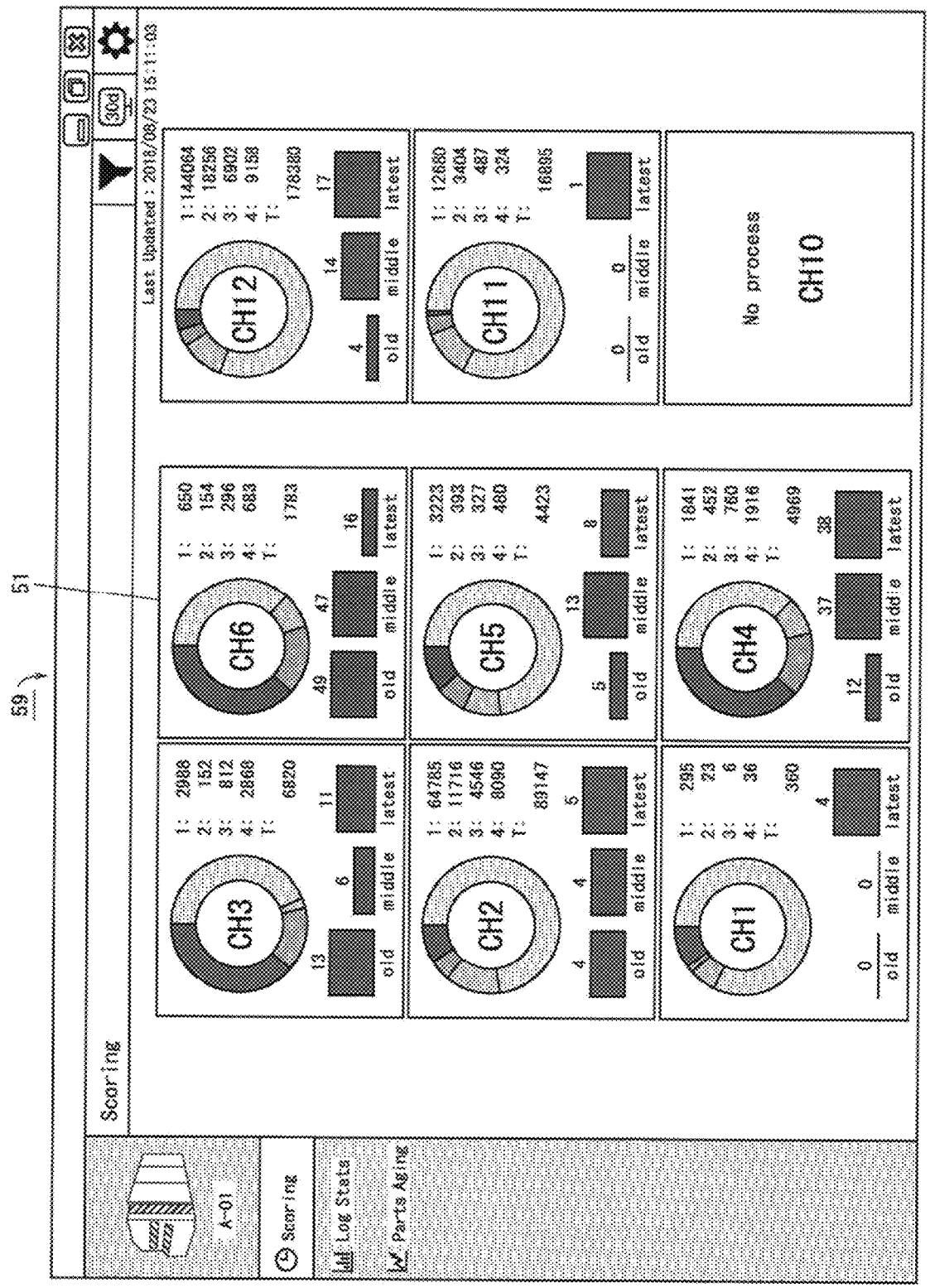
FIG. 11 is a diagram showing another evaluation result screen of the data processing apparatus shown in FIG. 1.

Next, the chamber filter function will be described. FIG. 11 is a diagram showing another evaluation result screen of the data processing apparatus 10. The evaluation result screen 59 shown in FIG. 11 has 9 display areas 51 corresponding to 9 processing units among the 12 processing units 25. A circle graph 52, the number 53 of occurrences of a level, and a bar graph 54 are displayed in each display area 51 of the evaluation result screen 59.

When the evaluation result screen 59 is displayed, processing units (hereinafter referred to as display target processing units) for which evaluation results will be displayed are selected from the 12 processing units 25. The display target processing units may be selected in advance when the data processing apparatus 10 is initially set or arbitrarily selected by the user. The filter 15 selects scores SC and levels LV related to substrates processed by the display target processing units from the scores SC and the levels LV stored in the score/level storage 14. The result display 16 displays the evaluation result screen 59 including circles graphs 52, the numbers 53 of occurrences of levels, and bar graphs 54 with respect to the display target processing units on the basis of the scores SC and the levels LV selected by the filter 15.

When the number of display target processing units is less than the number of processing units 25 (here, 12), the positions of display areas in the evaluation result screen may be different from those of the display areas 51 in the evaluation result screen 50. Further, the size of the display area in the evaluation result screen may be greater than the size of the display area 51 in the evaluation result screen 50.

The filter 15 may select scores SC and levels LV by arbitrarily combining the period filter, the recipe filter and the chamber filter. Further, the filter 15 may perform filtering processes other than the aforementioned ones.

Next, the hierarchy display function will be described with reference to FIGS. 12 to 19. FIGS. 12 to 19 show various screens displayed to be overlaid on the evaluation result screen 50 shown in FIG. 6 in a switching manner in a tab form. Icons 81 to 84 are displayed at the upper parts of the screens shown in FIGS. 12 to 19.

Figure 12:
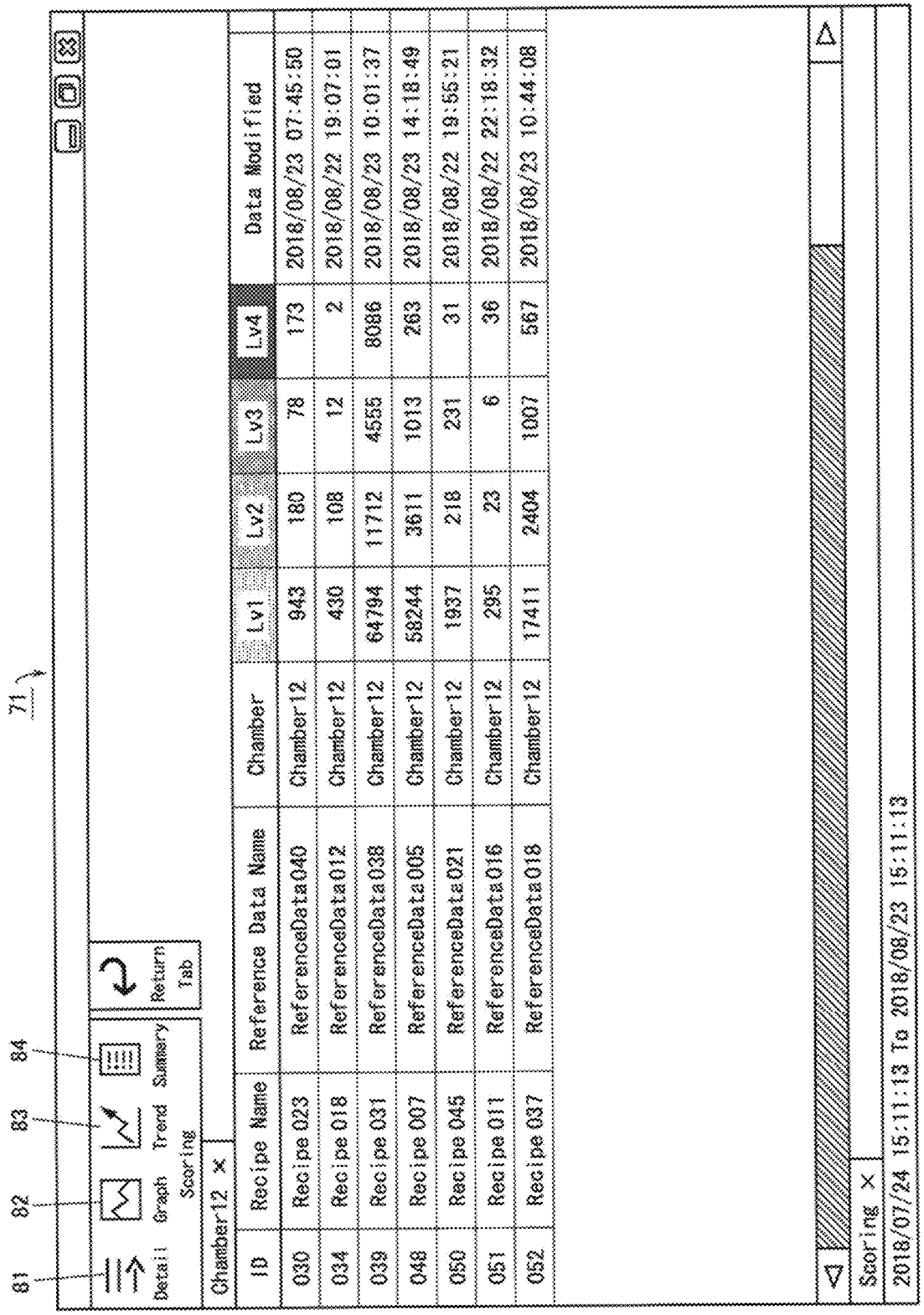
FIG. 12 is a diagram showing a scoring setting screen of the data processing apparatus shown in FIG. 1.

When the user operates the mouse 39 to select one processing unit (here, the twelfth processing unit 25) in the evaluation result screen 50, a score setting screen 71 shown in FIG. 12 is displayed. A method of obtaining scores (hereinafter referred to as scoring setting), and the number of occurrences of each level when the method has been used are displayed in each row of a list in the scoring setting screen 71. Scoring setting includes a scoring setting ID, a recipe name, a reference data name, and the like. The number "8086" in the third row of the list in the scoring setting screen 71 indicates that the number of occurrences of level 4 is 8086 when the twelfth processing unit 25 has performed a process according to the recipe "Recipe031" on a plurality of substrates and compared time-series data acquired at that time with reference data "Reference-Data038" to obtain scores.

Figure 13:
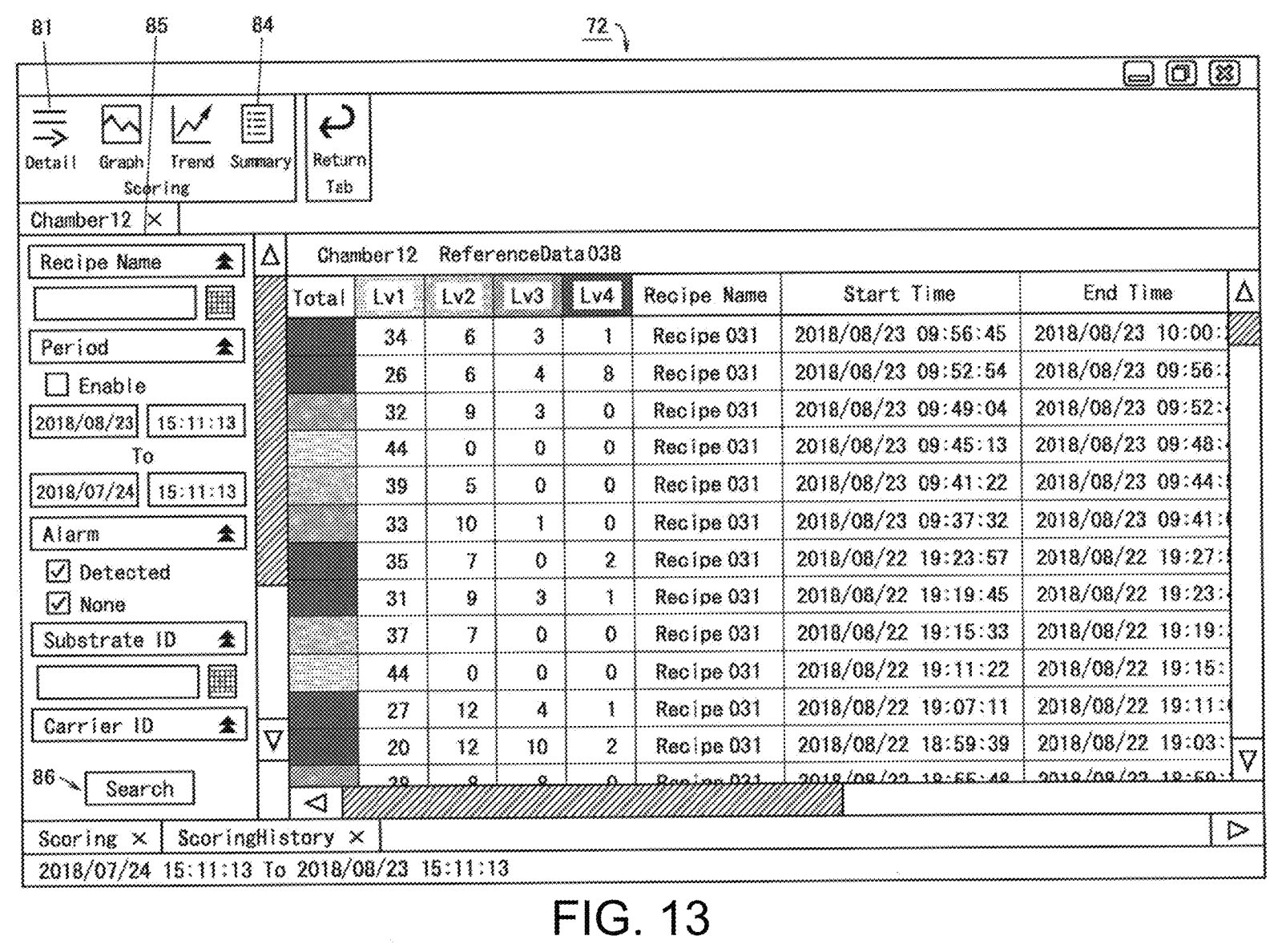

When the user operates the mouse 39 to select one scoring setting (here, scoring setting in the third row) from the list in the scoring setting screen 71, a scoring history screen 72 shown in FIG. 13 is displayed. Results (hereinafter referred to as processing results) obtained when a unit process has been performed on one substrate are displayed in each row of a list in the scoring history screen 72. Processing results include total evaluation (total), the numbers of occurrences of levels 1 to 4, a recipe name, a process start date and time, a process end date and time, and the like. The number "8" in the second row of the list in the scoring history screen 72 indicates that the number of occurrences of level 4 is 8 with respect to a substrate on which the twelfth processing unit 25 started a process from 9 o'clock 52 minutes 54 seconds on 23 Aug. 2018. The section of total evaluation is displayed in a color allocated to a worst level that has occurred. When the worst level that has occurred is levels 1 to 4, the section of total evaluation is displayed in light blue sky, dark blue sky, light blue and dark blue, for example.

The scoring history screen 72 has a search setter 85. The user operates the mouse 39 and the keyboard 38 to input a character string for search or a check into each section (recipe name, period, warning, or the like) in the search setter 85 and then presses a search button 86. Accordingly, processing results with respect to substrates that have satisfied a condition designated using the search setter 85 are displayed in the list in the scoring history screen 72. Meanwhile, when character string search is performed, partial matching or full matching can be selected.

Figure 14:
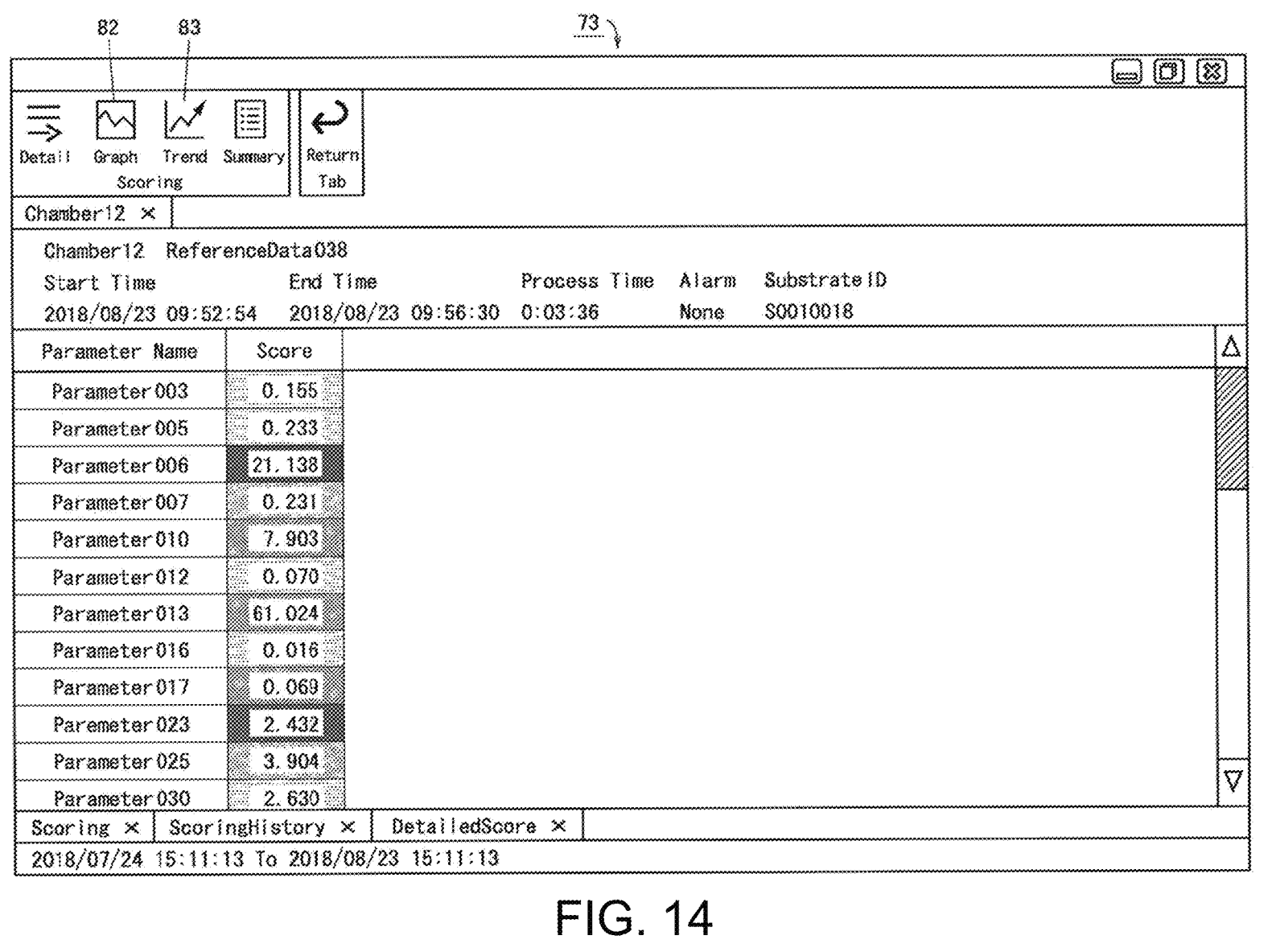

When the user operates the mouse 39 to select one processing result (here, the processing result in the second row) from the list in the scoring history screen 72 and then selects the icon 81, a detailed score screen 73 shown in FIG. 14 is displayed. A parameter name and a score are displayed in each row of a list in the detailed score screen 73. A score section is displayed in a color allocated to a score level. In the case of score levels 1 to 4, the score section is displayed in light sky blue, dark sky blue, light blue and dark blue, for example. The number "21.138" in the third row of the list in the detailed score screen 73 indicates that a score with respect to a parameter "Parameter006" is 21.138. The level of this score is 4.

Figure 15:
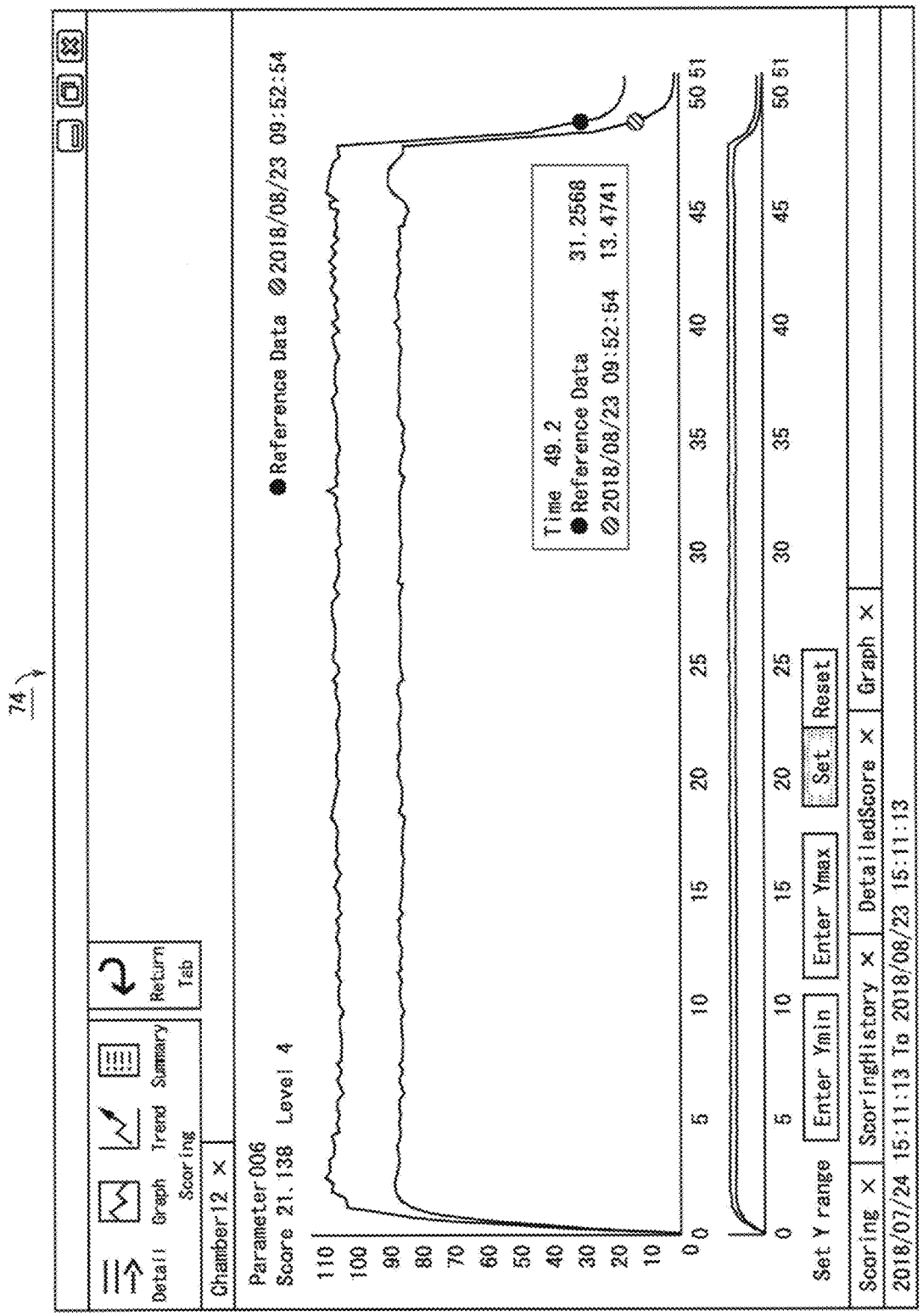
FIG. 15 is a diagram showing a graph screen of the data processing apparatus shown in FIG. 1.

When the user operates the mouse 39 to select one parameter (here, the parameter of the third row) from the list in the detailed score screen 73 and then selects the icon 82, a graph screen 74 shown in FIG. 15 is displayed. The graph screen 74 includes two graphs having a relatively large vertical size and two graphs having a relatively small horizontal size (hereinafter the former is referred to as enlarged graphs and the latter is referred to as entire graphs). One of two graphs is a graph of reference data RD and the other is a graph of time-series data SD.

The entire graphs show the entire periods to be displayed. The enlarged graphs enlarge and show a range designated by the user in the entire graphs. A range in the horizontal direction of the entire graphs included in the enlarged graphs is designated by the user operating the mouse 39 to select a part of the entire graphs. A range in the vertical direction of the entire graphs included in the enlarged graphs is designated by the user operating the mouse 39 and the keyboard 38 to input a minimum value and a maximum value in the vertical direction to two sections indicated by "Set Y Range." Meanwhile, in FIG. 15 (and FIGS. 16, 18 and 19 described later), the entire range in the horizontal direction of the entire graphs is designated as a range in the horizontal direction of the entire graphs included in the enlarged graphs.

Figure 16:
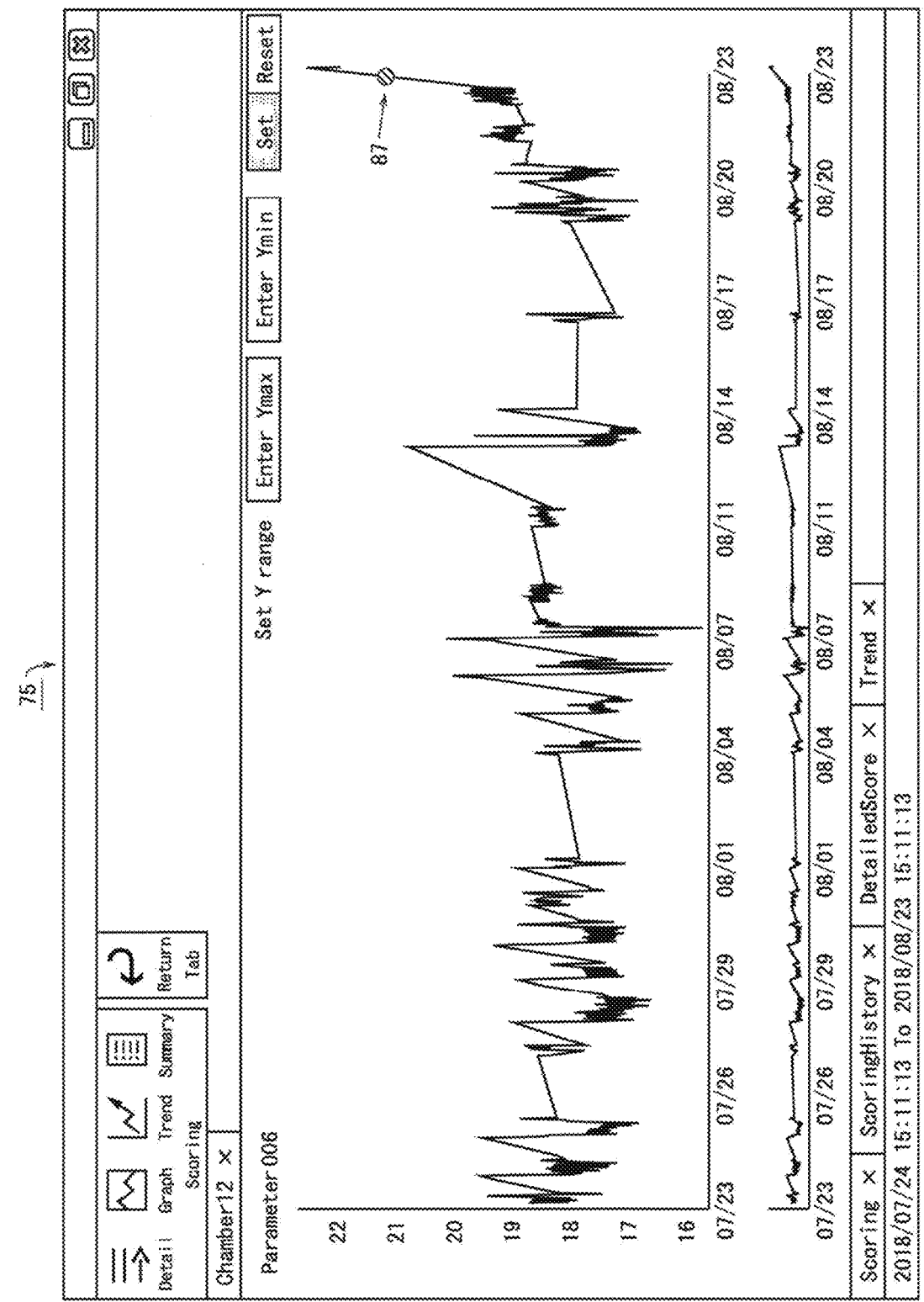
FIG. 16 is a diagram showing a trend screen of the data processing apparatus shown in FIG. 1.

The user operates the mouse 39 to select one parameter (here, the parameter of the third row) from the list in the detailed score screen 73 and then selects the icon 83, a trend screen 75 shown in FIG. 16 is displayed. The trend screen 75 includes one entire graph and one partial graph. Each graph shows temporal change in scores. In the entire graph in the trend screen 75, a mark 87 is attached at a position corresponding to a processing result selected in the scoring history screen 72. The mark 87 is displayed in a state (e.g., as a red circle) easily ascertained by the user.

Figure 17:
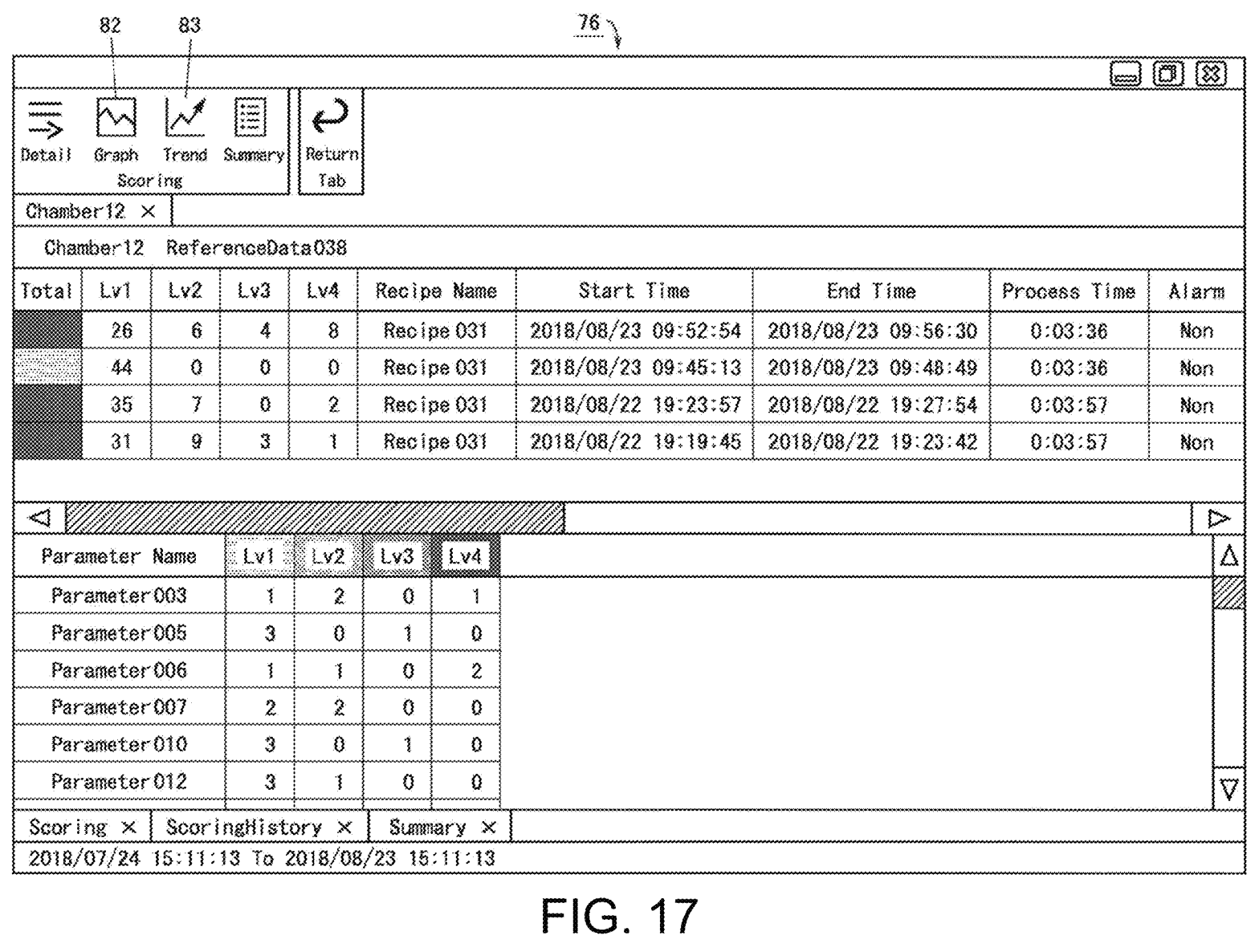

When the user operates the mouse 39 to select a plurality of processing results (here, the processing results of the second, fourth, seventh and eighth rows) from the list in the scoring history screen 72) and then selects the icon 84, a summary screen 76 shown in FIG. 17 is displayed. The summary screen 76 includes two lists. A plurality of processing results selected in the scoring history screen 72 are displayed in an upper list. Parameter names and the numbers of occurrences of levels 1 to 4 are displayed in each row of a lower list as processing results with respect to the plurality of substrates. The number "2" in the third row of the lower list in the summary screen 76 indicates that the number of occurrences of level 4 with respect to a parameter "Parameter006" is 2 in four processing results (processing results of four substrates) selected in the scoring history screen 72.

Figure 18:
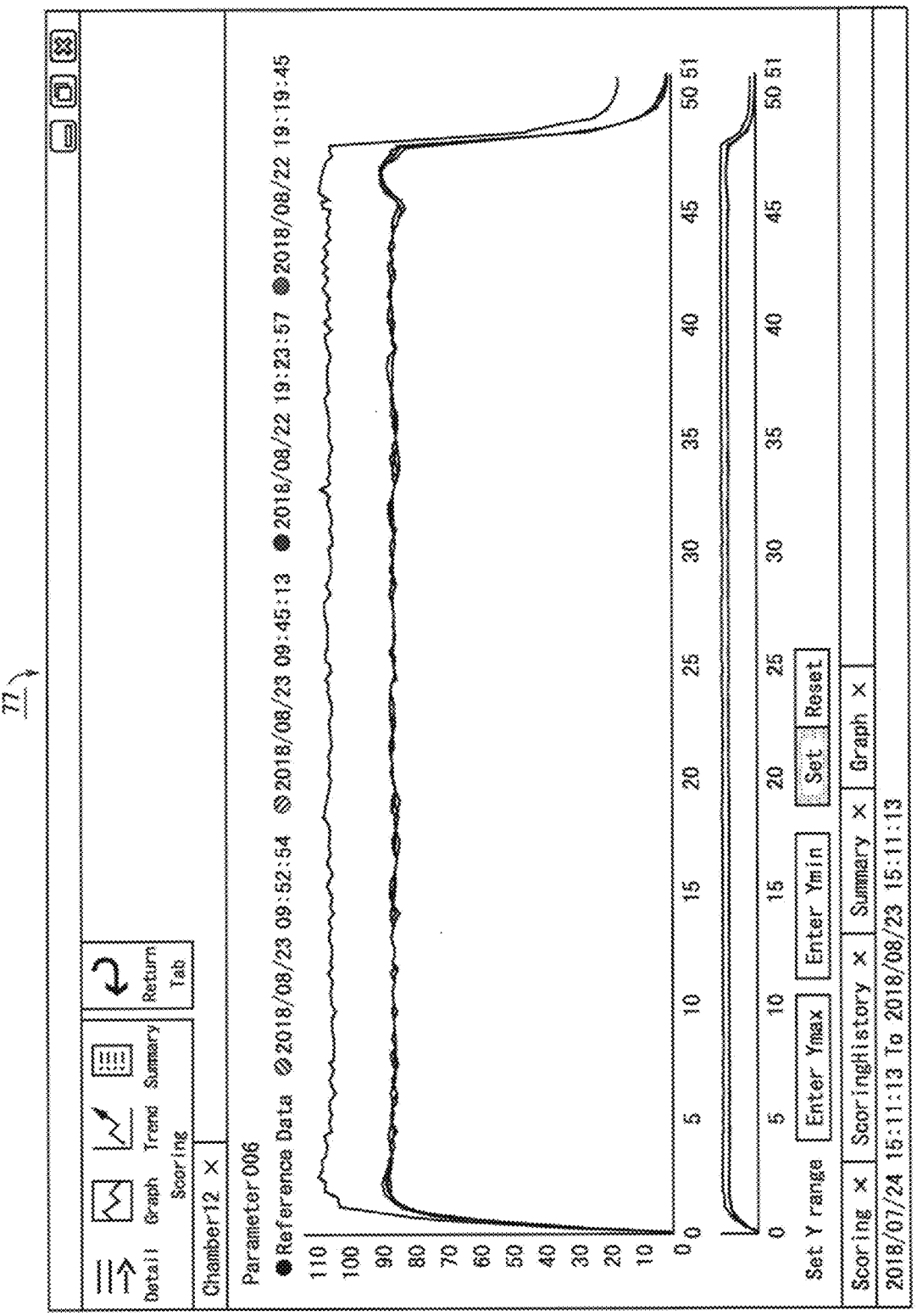
FIG. 18 is a diagram showing a graph screen of the data processing apparatus shown in FIG. 1.

When the user operates the mouse 39 to select one parameter (here, the parameter of the third row) from the lower list in the summary screen 76 and then selects the icon 82, a graph screen 77 shown in FIG. 18 is displayed. When the number of processing results selected from the list in the scoring history screen 72 is m (m is a natural number equal to or greater than 2), the graph screen 77 includes (m+1) partial graphs and (m+1) entire graphs. One of the (m+1) graphs is a graph of reference data RD and others are graphs of time-series data SD.

Figure 19:
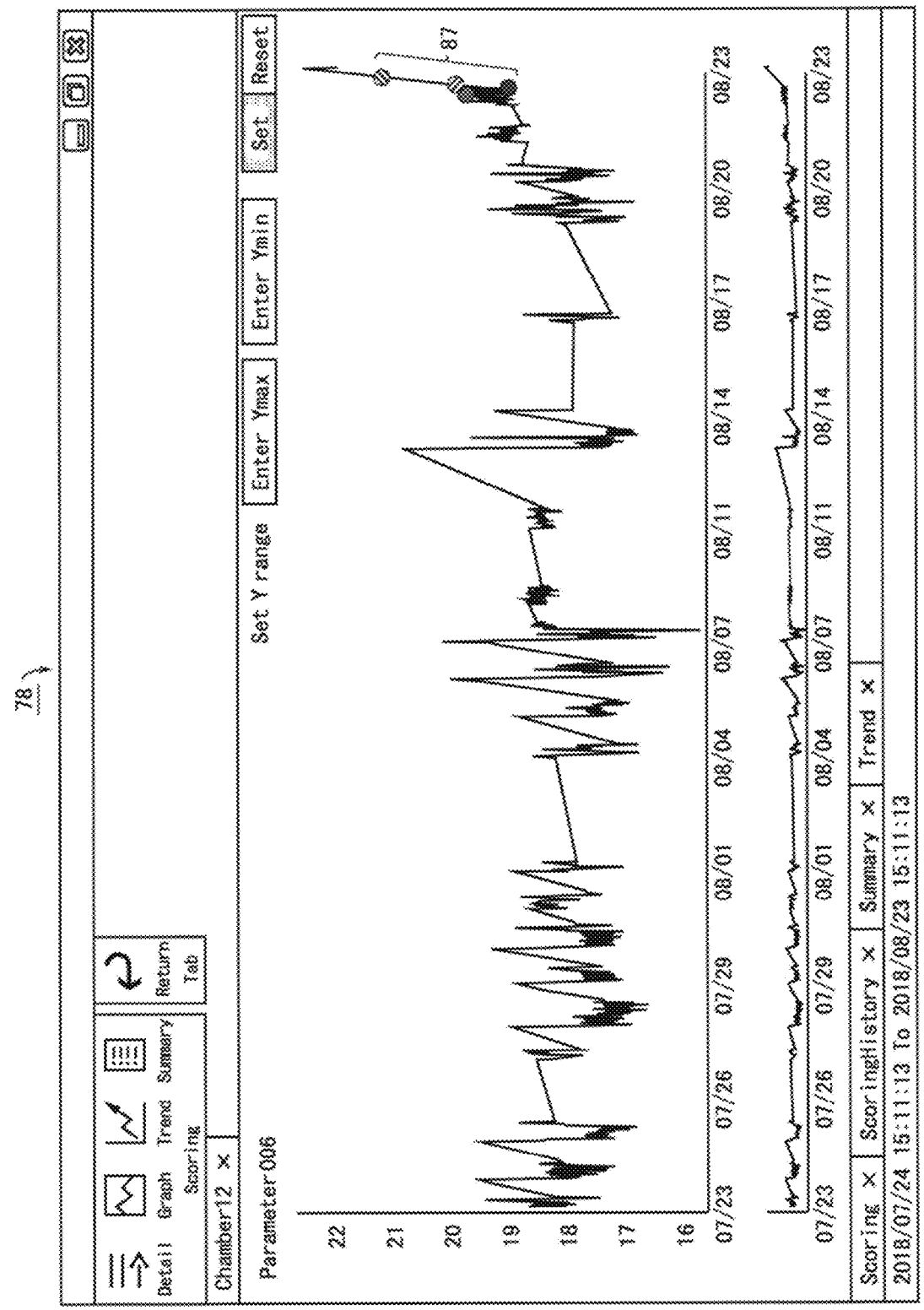
FIG. 19 is a diagram showing a trend screen of the data processing apparatus shown in FIG. 1.

When the user operates the mouse 39 to select one parameter (here, the parameter of the third row) from the lower list in the summary screen 76 and then selects the icon 83, a trend screen 78 shown in FIG. 19 is displayed. Graphs displayed in the trend screen 78 are the same as the graphs displayed in the trend screen 75. In the entire graphs in the trend screen 78, a plurality of marks 87 (here, four marks) are attached at positions corresponding to a plurality of processing results selected in the scoring history screen 72.

In this manner, the result display 16 displays the evaluation result screen 50, the scoring setting screen 71 and the scoring history screen 72 in a hierarchical manner. When one processing result is selected in the scoring history screen 72, the result display 16 continuously displays the detailed score screen 73 and the graph screen 74 or the trend screen 75 in a hierarchical manner. When a plurality of processing results are selected in the scoring history screen 72, the result display 16 continuously displays the summary screen 76 and the graph screen 77 or the trend screen 78 in a hierarchical manner.

The scoring setting screen 71 corresponds to a screen for selecting a method of obtaining evaluated values (scoring setting). The scoring history screen 72 corresponds to a history screen that displays a history in which evaluated values (scores) have been obtained. The detailed score screen 73 and the summary screen 76 correspond to screens for selecting a display target. The graph screens 74 and 77 correspond to screens including graphs of the time-series data SD. The trend screens 75 and 78 include graphs showing temporal change of evaluated values (scores).

Figure 20:
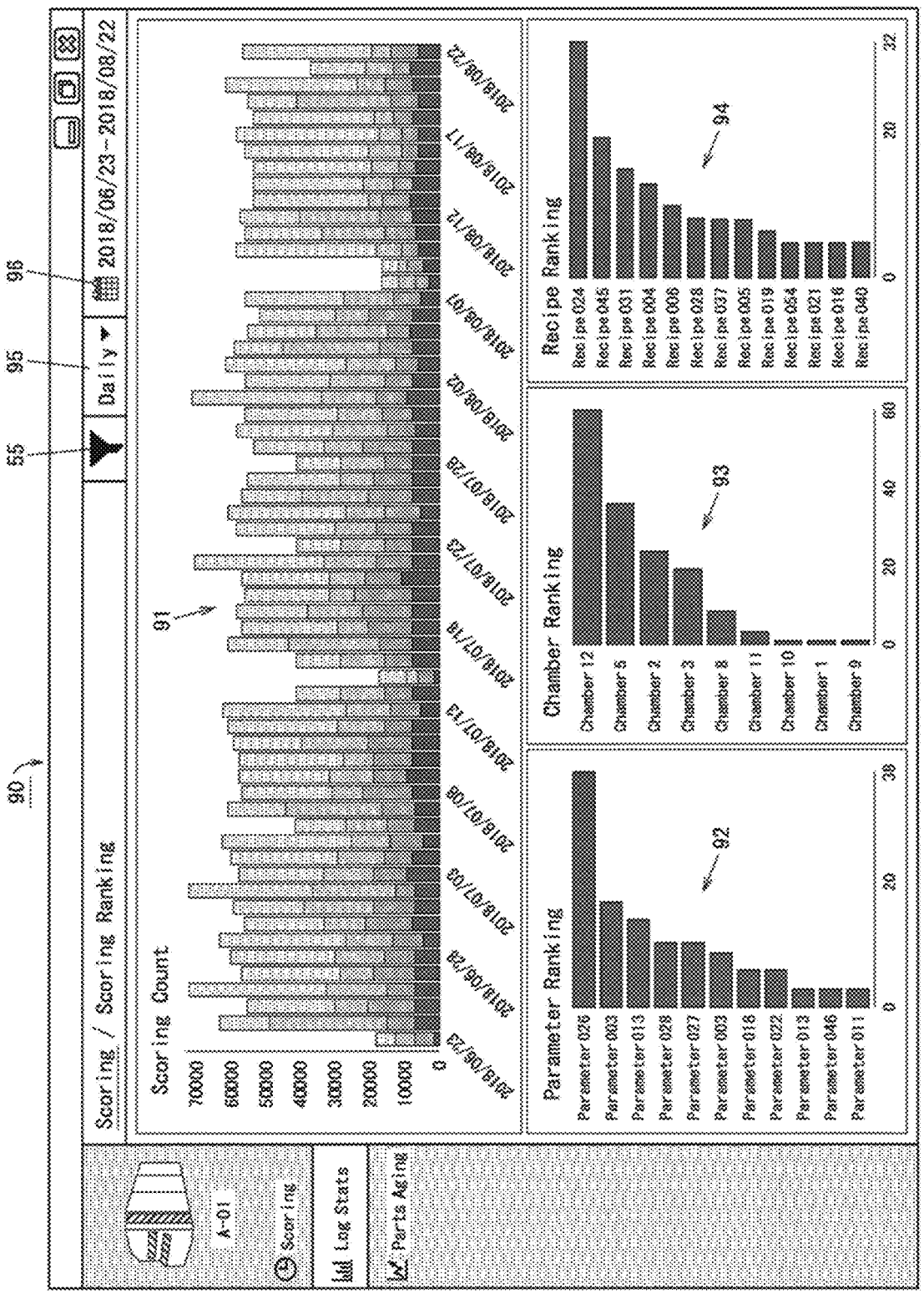
FIG. 20 is a diagram showing a log statistics screen of the data processing apparatus shown in FIG. 1.

Next, the log statistics screen display function will be described. FIG. 20 is a diagram showing a log statistics screen displayed in step S109 shown in FIG. 5. The log statistics screen 90 shown in FIG. 20 includes four bar graphs 91 to 94. Icons 55, 95 and 96 are displayed in the upper part of the log statistics screen 90. The log statistics screen 90 is displayed by switching the status display icon present in the left part of the evaluation result screen 50 shown in FIG. 6. Meanwhile, the numbers of occurrences of levels 1 to 4 in the log statistics screen 90 are not consistent with the numbers of occurrences of levels 1 to 4 in the evaluation result screen 50 for convenience of drawing.

When the log statistics screen 90 is displayed, a totalization period and a totalization unit are set. When the user operates the mouse 39 to select the icon 96, a calendar screen (not shown) is displayed. When the user operates the mouse 39 to select two dates from the calendar screen, a start date and an end date of a totalization period are set. When the user operates the mouse 39 to select the icon 95, a pull-down menu (not shown) is displayed. Each item of the pull-down menu indicates a totalization unit. When the user operates the mouse 39 to select one item from the pull-down menu, a totalization unit is set. In the log statistics screen 90, a totalization period is set to a period from 23 Jun. 2018 to 22 Aug. 2018 and a totalization unit is set to one day (daily).

The bar graph 91 shows temporal change in the numbers of occurrences of levels 1 to 4 of scores SC with respect to substrates processed within the totalization period. Respective bars included in the bar graph 91 represent the numbers of occurrences of levels 1 to 4 with respect to substrates processed in the totalization unit (here, one day) in all processing units 25. The bar graph 91 is displayed in a state in which a worse level is recognized by the user more easily like the circle graph 52. Levels 1 to 4 are respectively displayed in light sky blue, dark sky blue, light blue and dark blue, for example. The bar graphs 92 to 94 show the number of occurrences of level 4, which is divided into occurrence causes, in a ranking form with respect to substrates processed within the totalization period. The bar graph 92 shows the number of occurrences of level 4 in a ranking form for each parameter. The bar graph 93 shows the number of occurrences of level 4 in a ranking form for each chamber. The bar graph 94 shows the number of occurrences of level 4 in a ranking form for each recipe.

When the user operates the mouse 39 to select the icon 55 included in the log statistics screen 90, the filter 15 performs the same filtering process as that when the user selects the icon 55 included in the evaluation result screen 50. The result display 16 displays the log statistics screen 90 on the basis of scores SC and levels LV selected by the filter 15.

As described above, the data processing method according to the present embodiment includes the evaluated value calculation step S102 of obtaining evaluated values (scores SC) of time-series data SD by comparing the time-series data SD with reference data RD in order to process the time-series data SD acquired in the substrate processing apparatus 20 having the one or more processing units 25, the level determination step S103 of classifying evaluated values into a plurality of levels, and the result display step S108 of displaying the evaluation result screen 50 including a first graph (circle graph 52) showing an occurrence rate of each level of the evaluated values with respect to the processing unit 25.

Therefore, the user can easily ascertain a rate at which each level (particularly, level 4 that is the worst level) occurs in the processing unit 25 by viewing the first graph. Particularly, when the substrate processing apparatus 20 includes a plurality of processing units 25, the user can easily ascertain a processing unit 25 in which the worst level (level 4) occurs at a high rate by comparing a plurality of first graphs. In this manner, the user can easily ascertain a state of the substrate processing apparatus 20.

The first graph is displayed in a state in which a worse level is recognized more easily (in a darker color). Accordingly, the aforementioned effects become remarkable. The first graph is a circle graph or a band graph. Therefore, it is possible to easily show an occurrence rate of each level of evaluated values.

The evaluation result screen 50 includes the number of occurrences (the number 53 of occurrences) of each level of evaluated values with respect to the processing unit 25. Accordingly, the user can ascertain a correct value of the number of occurrences of each level of evaluated values in the processing unit 25.

The evaluation result screen 50 includes a second graph (bar graph 54) showing temporal change in the number of occurrences of a worst level of evaluated values when substrates have been processed using a predetermined method (specific recipe) with respect to the processing unit 25. Accordingly, the user can ascertain temporal change in a worst level occurrence situation and recognize whether the processing unit 25 approaches an abnormal state by viewing the second graph. The second graph is a bar graph or a broken line graph. Therefore, it is possible to easily show temporal change in a worst level occurrence situation.

The data processing method according to the present embodiment includes the evaluated value selection step S106 of selecting evaluated values related to substrates that satisfy a given condition from evaluated values obtained in the evaluated value calculation step, and the result display step displays the evaluation result screen 50 on the basis of the evaluated values selected in the evaluated value selection step. Accordingly, the user can easily ascertain a state of the substrate processing apparatus 20 by applying appropriate conditions. The evaluated value selection step selects a level having at least any one of a substrate processing period, a process performed on substrates, and a processing unit that has processed substrates as a condition. Accordingly, the user can easily ascertain states of the processing units 25 in a specific period, states of the processing units 25 when a specific process has been performed, and the state of a specific processing unit 25.

The result display step hierarchically displays at least any of a screen for selecting a method of obtaining evaluated values (the scoring setting screen 71), a history screen displaying a history in which evaluated values have been obtained (the scoring history screen 72), a screen for selecting a display target (the detailed score screen 73 and the summary screen 76) and a screen including graphs of time-series data (the graph screens 74 and 77) or trend screens 75 and 78 including graphs showing temporal change of evaluated values in addition to the evaluation result screen 50. Accordingly, the user can easily analyze time-series data SD or evaluated values with respect to substrates having evaluated values of worse levels. The result display step displays the trend screens 75 and 78, and a mark 87 is attached at a position corresponding to a processing result selected in the history screen on a graph in the trend screens 75 and 78. Accordingly, the user can easily recognize a position on a graph in the trend screens 75 and 78 which corresponds to a processing result selected in the history screen.

The result display step displays the log statistics screen 90 including a graph (the bar graph 91) showing temporal change in the number of occurrences of each level of evaluated values with respect to substrates processed within a totalization period and graphs (the bar graphs 92 to 94) showing the number of occurrences of a worst level of evaluated values, which is divided into occurrence causes, in a ranking form with respect to substrates processed within the totalization period. Accordingly, the user can ascertain temporal change in the number of occurrences of each level and easily ascertain a factor that causes many worst levels to occur by viewing the log statistics screen 90. It is possible to obtain suitable evaluated values with respect to time-series data SD by using other time-series data as reference data RD.

The data processing apparatus 10 and the data processing program 41 according to the present embodiment have the same features as those of the above-described data processing method and obtain the same effects. According to the data processing method, the data processing apparatus 10 and the data processing program 41 according to the present embodiment, the user can easily ascertain states of one or more processing units 25 included in the substrate processing apparatus 20.

Meanwhile, it is assumed that the evaluation result screen 50 includes the number 53 of occurrences of a level, the circle graph 52 and the bar graph 54 in the above-described processing method. However, the evaluation result screen 50 need not necessarily include all of the number 53 of occurrences of a level, the circle graph 52 and the bar graph 54. Further, it is assumed that the data processing method according to the present embodiment has the period filter function, the recipe filter function, the chamber filter function, the hierarchical display function and the log statistics screen display function. A data processing method according to a modified example may not have all of the aforementioned processes but may have only a process arbitrarily selected from the aforementioned processes. The same applies to a data processing apparatus and a data processing program according to the modified example.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data processing method for processing time-series data acquired in a substrate processing apparatus including two or more processing units, the time-series data being data obtained from physical quantities measured using a sensor during execution of processing performed on one substrate in a processing unit, the method comprising:
   obtaining evaluated values of the time-series data by comparing the time-series data with reference data, the reference data being other time-series data determined as expectation value data;
   classifying the evaluated values into a plurality of levels; and
   displaying an evaluation result screen including a display area including a first graph showing an occurrence rate of each level of the evaluated values, the evaluation result screen including the display area with respect to each of the two or more processing units,
   wherein a plurality of the display areas are two-dimensionally disposed within the evaluation result screen,
   a history screen displaying a history in which the evaluated values have been obtained and a trend screen including a graph showing temporal change in the evaluated values in addition to the evaluation result screen is hierarchically displayed, and
   a mark is attached at a position corresponding to a processing result selected in the history screen on a broken line in the graph in the trend screen so that the position corresponding to the processing result selected in the history screen is ascertained.

2. The data processing method according to claim 1, wherein
   the plurality of levels includes a best level and a worst level, the level is better as the evaluated value is smaller, and the first graph is displayed so that a worse level is displayed in a darker color.

3. The data processing method according to claim 1, wherein the first graph is a circle graph or a band graph.

4. The data processing method according to claim 1, wherein the evaluation result screen further includes the number of occurrences of each level of the evaluated values with respect to each of the two or more processing units.

5. The data processing method according to claim 1, wherein the data processing method further comprises selecting levels related to substrates which satisfy a given condition from levels obtained,
   and displaying the evaluation result screen on the basis of the levels selected.

6. The data processing method according to claim 5, wherein the levels having at least any of a substrate processing period, a process performed on substrates, and a processing unit which has processed substrates as a condition are selected.

7. The data processing method according to claim 1,
   wherein the plurality of levels includes a best level and a worst level, the level is better as the evaluated value is smaller, and
   a log statistics screen including a graph showing temporal change in the number of occurrences of each level of the evaluated values with respect to substrates processed within a totalization period, and a graph showing the number of occurrences of the worst level of the evaluated values, which is divided into occurrence causes, in a ranking form with respect to substrates processed within the totalization period is displayed.

8. The data processing method according to claim 1, wherein the history screen is configured to allow a plurality of processing results to be selected, and
   a plurality of marks are attached at positions corresponding to a plurality of processing results selected in the history screen on the broken line in the graph in the trend screen.

9. The data processing method according to claim 1, wherein the mark is a red circle.

10. A data processing apparatus for processing time-series data acquired in a substrate processing apparatus including two or more processing units, the time-series data being data obtained from physical quantities measured using a sensor during execution of processing performed on one substrate in a processing unit, wherein the data processing apparatus comprises
    a computer that:
        obtains evaluated values of the time-series data by comparing the time-series data with reference data, the reference data being other time-series data determined as expectation value data;
        classifies the evaluated values into a plurality of levels; and
        displays an evaluation result screen including a display area including a first graph showing an occurrence rate of each level of the evaluated values, the evaluation result screen including the display area with respect to each of the two or more processing units,
    wherein a plurality of the display areas are two-dimensionally disposed within the evaluation result screen,
    a history screen displaying a history in which the evaluated values have been obtained and a trend screen including a graph showing temporal change in the evaluated values in addition to the evaluation result screen is hierarchically displayed, and
    a mark is attached at a position corresponding to a processing result selected in the history screen on a broken line in the graph in the trend screen so that the position corresponding to the processing result selected in the history screen is ascertained.

11. The data processing apparatus according to claim 10, wherein
    the plurality of levels includes a best level and a worst level, the level is better as the evaluated value is smaller, and the first graph is displayed so that a worse level is displayed in a darker color.

12. The data processing apparatus according to claim 10, wherein the first graph is a circle graph or a band graph.

13. The data processing apparatus according to claim 10, wherein the evaluation result screen further includes the number of occurrences of each level of the evaluated values with respect to each of the two or more processing units.

14. The data processing apparatus according to claim 10, wherein the computer further selects levels related to substrates which satisfy a given condition from levels obtained, and displays the evaluation result screen on the basis of the levels selected.

15. The data processing apparatus according to claim 14, wherein the computer selects the levels having at least any of a substrate processing period, a process performed on substrates, and a processing unit which has processed substrates as a condition.

16. The data processing apparatus according to claim 10, wherein the plurality of levels includes a best level and a worst level, the level is better as the evaluated value is smaller, and
    the computer displays a log statistics screen including a graph showing temporal change in the number of occurrences of each level of the evaluated values with respect to substrates processed within a totalization period, and a graph showing the number of occurrences of the worst level of the evaluated values, which is divided into occurrence causes, in a ranking form with respect to substrates processed within the totalization period.

17. The data processing apparatus according to claim 10, wherein the history screen is configured to allow a plurality of processing results to be selected, and
    a plurality of marks are attached at positions corresponding to a plurality of processing results selected in the history screen on the broken line in the graph in the trend screen.

18. The data processing apparatus according to claim 10, wherein the mark is a red circle.

19. A data processing method for processing time-series data acquired in a substrate processing apparatus including two or more processing units, the time-series data being data obtained from physical quantities measured using a sensor during execution of processing performed on one substrate in a processing unit, the method comprising:
    obtaining evaluated values of the time-series data by comparing the time-series data with reference data, the reference data being other time-series data determined as expectation value data;
    classifying the evaluated values into a plurality of levels; and
    displaying an evaluation result screen including a display area including a first graph showing an occurrence rate of each level of the evaluated values, the evaluation result screen including the display area with respect to each of the two or more processing units,
    wherein a plurality of the display areas are two-dimensionally disposed within the evaluation result screen,
    a history screen displaying a history in which the evaluated values have been obtained and a trend screen including graphs showing temporal change in the evaluated values in addition to the evaluation result screen is hierarchically displayed,
    a mark is attached at a position corresponding to a processing result selected in the history screen in a graph in the trend screen,
    the plurality of levels includes a best level and a worst level, the level is better as the evaluated value is smaller, and
    a log statistics screen including a graph showing temporal change in the number of occurrences of each level of the evaluated values with respect to substrates processed within a totalization period, and a graph showing the number of occurrences of the worst level of the evaluated values, which is divided into occurrence causes, in a ranking form with respect to substrates processed within the totalization period is displayed.

20. A data processing apparatus for processing time-series data acquired in a substrate processing apparatus including two or more processing units, the time-series data being data obtained from physical quantities measured using a sensor during execution of processing performed on one substrate in a processing unit, wherein the data processing apparatus comprises
    a computer that:
        obtains evaluated values of the time-series data by comparing the time-series data with reference data, the reference data being other time-series data determined as expectation value data;
        classifies the evaluated values into a plurality of levels; and
        displays an evaluation result screen including a display area including a first graph showing an occurrence rate of each level of the evaluated values, the evaluation result screen including the display area with respect to each of the two or more processing units,
    wherein a plurality of the display areas are two-dimensionally disposed within the evaluation result screen,
    a history screen displaying a history in which the evaluated values have been obtained and a trend screen including graphs showing temporal change in the evaluated values in addition to the evaluation result screen is hierarchically displayed, a mark is attached at a position corresponding to a processing result selected in the history screen in a graph in the trend screen, the plurality of levels includes a best level and a worst level, the level is better as the evaluated value is smaller, and the computer displays a log statistics screen including a graph showing temporal change in the number of occurrences of each level of the evaluated values with respect to substrates processed within a totalization period, and a graph showing the number of occurrences of the worst level of the evaluated values, which is divided into occurrence causes, in a ranking form with respect to substrates processed within the totalization period.

\* \* \* \* \*